US012416716B1

(12) United States Patent
Bohaichuk et al.

(10) Patent No.: US 12,416,716 B1
(45) Date of Patent: Sep. 16, 2025

(54) METHODS FOR SENSING DOPPLER SHIFTS

(71) Applicant: Quantum Valley Ideas Laboratories, Waterloo (CA)

(72) Inventors: Stephanie M. Bohaichuk, Waterloo (CA); Vijin Venu, Waterloo (CA); Florian Christaller, Waterloo (CA); Chang Liu, Waterloo (CA); James P. Shaffer, Kitchener (CA)

(73) Assignee: Quantum Valley Ideas Laboratories, Waterloo (CA)

( * ) Notice: Subject to any disclaimer, the term of this patent is extended or adjusted under 35 U.S.C. 154(b) by 0 days.

(21) Appl. No.: 19/075,343

(22) Filed: Mar. 10, 2025

Related U.S. Application Data

(60) Provisional application No. 63/563,533, filed on Mar. 11, 2024.

(51) Int. Cl.
*G01S 13/58* (2006.01)
*G01S 7/282* (2006.01)
*G01S 7/285* (2006.01)
*G01S 13/524* (2006.01)

(52) U.S. Cl.
CPC ............ *G01S 13/582* (2013.01); *G01S 7/282* (2013.01); *G01S 7/285* (2013.01); *G01S 13/524* (2013.01)

(58) Field of Classification Search
None
See application file for complete search history.

(56) References Cited

U.S. PATENT DOCUMENTS

| 10,564,201 B1 | 2/2020 | Shaffer |
| 10,605,840 B1 | 3/2020 | Amarloo et al. |
| 10,823,775 B2 | 11/2020 | Anderson et al. |

(Continued)

FOREIGN PATENT DOCUMENTS

CN 110488266 11/2019

OTHER PUBLICATIONS

S. Bohaichuk et al, "Origins of Rydberg-Atom Electrometer Transient Response and Its Impact on Radio-Frequency Pulse Sensing"; Phys. Rev. Applied 18, 034030—Published Sep. 13, 2022 DOI: https://doi.org/10.1103/PhysRevApplied.18.034030 (Year: 2022).*

(Continued)

*Primary Examiner* — Bernarr E Gregory
(74) *Attorney, Agent, or Firm* — Henry Patent Law Firm PLLC

(57) ABSTRACT

In a general aspect, a radar method includes transmitting an outgoing series of RF pulses toward a target region. The radar method also includes receiving an incoming series of RF pulses that is based on the outgoing series of RF pulses after passing through the target region. The radar method additionally includes producing, by operation of a vapor cell system, output signals that are based on incoming series of RF pulses and the laser signals interacting with a vapor of the vapor cell system. The radar method also includes operations of a signal processing system, such as generating response data, determining a Doppler shift, and determining a velocity of an object in the target region. The response data includes transient response data that represents transient responses of a vapor in the vapor cell system to respective phase changes in the incoming series of RF pulses.

30 Claims, 21 Drawing Sheets

(56) References Cited

U.S. PATENT DOCUMENTS

| | | | |
|---|---|---|---|
| 11,300,599 | B1 | 4/2022 | Amarloo et al. |
| 11,307,233 | B1 | 4/2022 | Amarloo et al. |
| 11,313,926 | B1 | 4/2022 | Amarloo et al. |
| 11,366,430 | B2 | 6/2022 | Ramirez-serrano et al. |
| 11,435,234 | B1 | 9/2022 | Keaveney et al. |
| 11,598,798 | B1 * | 3/2023 | Bucklew ............ G01R 29/0885 |
| 11,658,461 | B1 | 5/2023 | Liu et al. |
| 11,681,016 | B1 | 6/2023 | Bohaichuk et al. |
| 11,843,420 | B1 | 12/2023 | Caliga et al. |
| 11,885,904 | B2 | 1/2024 | Bohaichuk et al. |
| 12,032,010 | B1 * | 7/2024 | Caliga ................ G01R 29/0878 |
| 12,105,129 | B2 * | 10/2024 | Anderson ......... G01R 29/0892 |
| 2019/0187198 | A1 * | 6/2019 | Anderson ......... G01R 29/0878 |
| 2020/0233025 | A1 * | 7/2020 | Salim ................ G01R 29/0885 |
| 2021/0250101 | A1 * | 8/2021 | Gordon ................. H01Q 1/366 |
| 2021/0255228 | A1 * | 8/2021 | Salim ..................... G01R 33/60 |
| 2022/0196716 | A1 | 6/2022 | Anderson et al. |
| 2022/0390496 | A1 * | 12/2022 | Aksyuk ............ G01R 29/0892 |
| 2023/0059575 | A1 * | 2/2023 | Bucklew ............ G01R 29/0892 |
| 2023/0081451 | A1 * | 3/2023 | Salim ..................... G01R 33/60 324/316 |
| 2023/0204714 | A1 | 6/2023 | Bohaichuk et al. |
| 2023/0221406 | A1 | 7/2023 | Bucklew et al. |

OTHER PUBLICATIONS

Adams, et al., "Rydberg atom quantum technologies", J. Phys. B: At. Mol. Opt Phys. 53, Dec. 3, 2019, 14 pgs.

Bohaichuk, et al., "A Three-Photon Rydberg Atom-Based Radio Frequency Sensing Scheme with Narrow Linewidth", arXiv:2304.07409 [physics.atom-ph] (2023), 2023, 11 pages.

Bohaichuk, et al., "The Origins of Rydberg Atom Electrometer Transient Response and its Impact on Radio Frequency Pulse Sensing", arXiv:2203.01733, Mar. 3, 2022, 21 pgs.

Chakrapani, Arvind, "On the design details of SS/PBCH, Signal Generation and PRACH in 5G-NR", Chakrapani, Arvind (2020): On the design details of SS/PBCH, Signal Generation and PRACH in 5G-NR. TechRxiv. Preprint. https://doi.org/10.36227/techrxiv.12465743.v3, 2020, 23 pages.

Dixon, Katelyn, "Rydberg atom-based Electrometry Using a Self-Heterodyne Frequency Comb Readout and Preparation Scheme", Physical Review Applied 19, 034078 (2023)., 2023, 8 Pages.

Fan, et al., "Atom based RF electric field sensing", Journal of Physics B: Atomic, Molecular and Optical Physics 48 202001 (2015), Sep. 9, 2015, 17 pgs.

Fan, et al., "Dispersive radio frequency electrometry using Rydberg atoms in a prism-shaped atomic vapor cell", J. Phys. B: At. Mol. Opt. Phys. 49 (2016) 104004, 2016, 8 pgs.

Fan, et al., "Effect of Vapor-Cell Geometry on Rydberg-Atom-Based Measurements of Radio-Frequency Electric Fields", Physical Review Applied 4, 044015 (2015), 2015, 7 pgs.

Fan, et al., "Subwavelength microwave electric-field imaging using Rydberg atoms inside atomic vapor cells", Optics Letters, vol. 39, No. 10, 3030-3033, May 15, 2014, 4 pgs.

Kumar, et al., "Atom-Based Sensing of Weak Radio Frequency Electric Fields Using Homodyne Readout", Scientific Reports 7:42981, Feb. 20, 2017, 10 pgs.

Kumar, et al., "Rydberg-atom based radio-frequency electrometry using frequency modulation spectroscopy in room temperature vapor cells", Optics Express, vol. 25, No. 8, Apr. 17, 2017, 13 pgs.

Noaman, et al., "Rydberg-Atom Sensors in Bichromatic Radio-Frequency Fields", Phys. Rev. Applied 20, 024068., Aug. 28, 2023, 6 pages.

Noaman, et al., "Vapor Cell Characterization and Optimization for Applications in Rydberg Atom-Based Radio Frequency Sensing", Proceedings vol. 12447, Quantum Sensing, Imaging, and Precision Metrology; 124470V (2023), Mar. 8, 2023, 6 pages.

Schmidt, et al., "Rydberg atom-based radio frequency sensors: amplitude regime sensing", arXiv:2307.00121v1 [physics.atom-ph], retrieved on Jun. 30, 2023, 33 pages.

Sedlacek, et al., "Atom-Based Vector Microwave Electrometry Using Ribidium Rydberg Atoms in a Vapor Cell", Physical Review Letters, Aug. 6, 2013, 5 pgs.

Sedlacek, et al., "Microwave electrometry with Rydberg atoms in a vapour cell using bright atomic resonances", Nature Physics, vol. 8, 819-824 (2012), Sep. 16, 2012, 6 pgs.

Shaffer, et al., "A read-out enhancement for microwave electric field sensing with Rydberg atoms", Proc. SPIE vol. 10674, Quantum Technologies 2018, 2018, 12 pgs.

ISA, International Search Report and Written Opinion issued in Application No. PCT/CA2025/050330 on May 9, 2025, 8 pages.

ISA, International Search Report and Written Opinion issued in Application No. PCT/CA2025/050331 on May 16, 2025, 9 pages.

Anderson, et al., "Rydberg atoms for radio-frequency communications and sensing: U atomic receivers for pulsed RF field and phase detection", IEEE Aerospace and Electronic Systems Magazine 35.4, 2020, pp. 48-56.

* cited by examiner

METHODS FOR SENSING DOPPLER SHIFTS

CROSS-REFERENCE TO RELATED APPLICATIONS

This application claims priority to U.S. Prov. Pat. App. No. 63/563,533, which was filed on Mar. 11, 2024, and entitled, "Sensing Radio Frequency Electromagnetic Fields Using Transient Sensor Responses." The disclosure of the priority application is hereby incorporated herein by reference in its entirety.

BACKGROUND

The following description relates to methods for sensing Doppler shifts.

Radar systems are used in a variety of applications including, for example, air traffic control, weather monitoring, law enforcement, maritime navigation, military defense, missile guidance, and others. Radar systems generally operate by transmitting radio frequency (RF) signals toward an area of interest and monitoring for RF signals reflected from the area of interest. The reflected RF signals can then be analyzed, for example, to detect moving objects.

DETAILED DESCRIPTION

Figure 1:
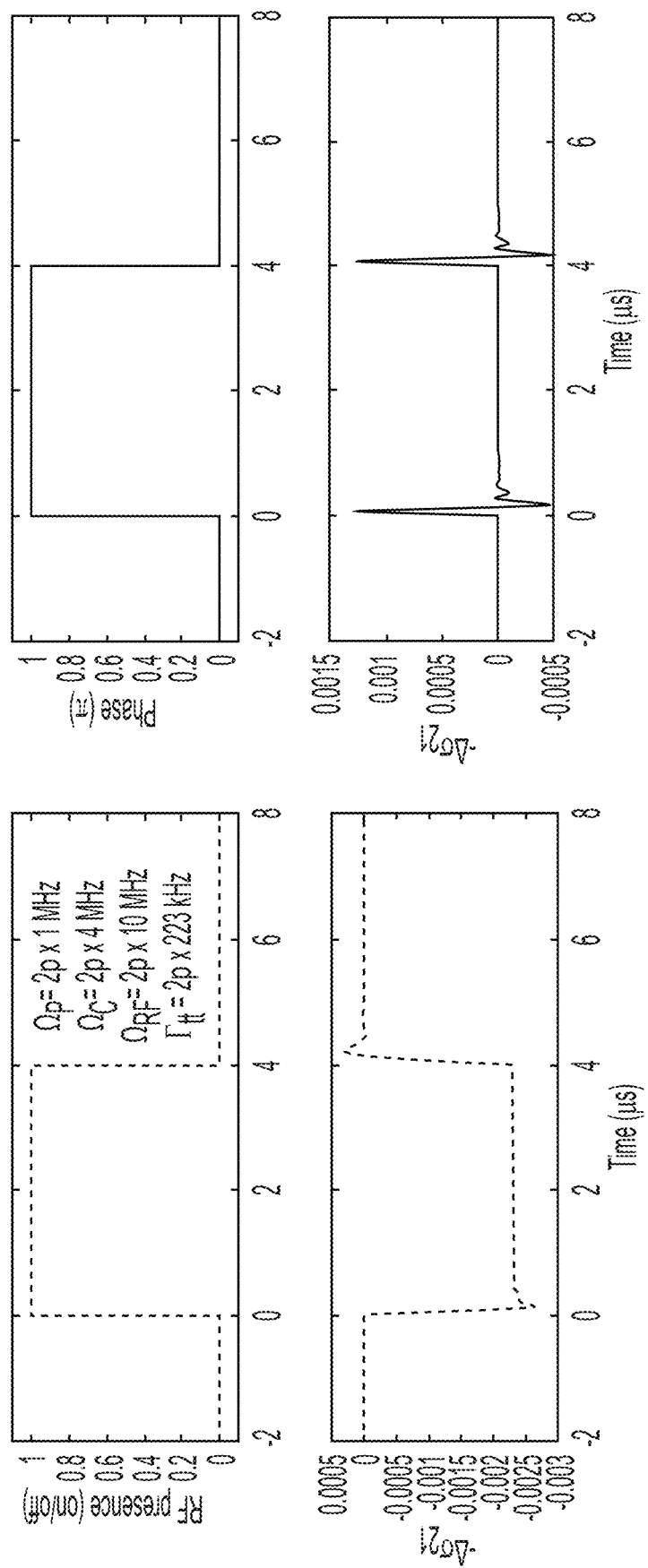
FIG. 1 is a series of graphs that show an example simulated response of a two-laser EIT Rydberg vapor-based sensor to an amplitude-modulated (left) and phase-modulated (right) RF electromagnetic field.

In a general aspect, Doppler shifts are detected based on the transient responses of a vapor. For example, vapor cell sensors can be used to detect Doppler shifts in incoming radio frequency (RF) signals. In some examples, output generated by a vapor cell sensor may represent the transient responses of a vapor in the vapor cell sensor to phase changes in the incoming RF signals. In some examples, the vapor cell sensor is part of a radar system, and the phase changes in the incoming RF signals are based on a reference phase modulation applied to the outgoing RF signals transmitted by the radar system.

In some implementations, a radar system includes a transmitter system and a receiver system. The transmitter system is configured to transmit an outgoing series of RF pulses toward a target region. The outgoing series of RF pulses have a reference phase modulation. The receiver system is configured to receive an incoming series of RF pulses that is based on the outgoing series of RF pulses after passing through the target region. For example, the outgoing series of RF pulses may produce the incoming series of RF pulses after scattering or reflecting off an object in the target region (e.g., an airplane, precipitation, etc.) The receiver system also includes a vapor cell system and a signal processing system. The vapor cell system includes a vapor and is configured to produce output signals that are based on laser signals and the incoming series of RF pulses interacting with the vapor. The signal processing system is configured to receive the output signals and perform operations that include generating, based on the output signals, response data that represents a response of the vapor to the laser signals and the incoming series of RF pulses. The response data includes transient response data that represents one or more transient responses of the vapor to respective phase changes in the incoming series of RF pulses. Moreover, the respective phase changes are based on the reference phase modulation of the outgoing series of RF pulses. The operations of the signal processing system also include determining, based on the transient response data, a Doppler shift in the incoming series of RF pulses. The Doppler shift results from the outgoing series of RF pulses interacting with an object in the target region. The operations additionally include determining a velocity of the object based on the Doppler shift.

In many implementations, the vapor cell system includes a vapor cell sensor that contains a vapor having Rydberg electronic states. The vapor cell sensor may correspond to a Rydberg vapor-based sensor and may be configured to sense the properties of an RF electromagnetic field, such as defined by one or more RF pulses. During operation, the vapor cell system can use the vapor cell sensor—and in particular, its transient response to the RF electromagnetic field—to sense a phase change in the one or more RF pulses. Such sensing can be advantageous in radar applications (e.g., Doppler radar applications), which often rely on RF pulses to define radar signals. Moreover, by sensing the phase change, the vapor cell system can help determine the velocity of moving targets based on the Doppler effect. Other properties are possible (e.g., distance). In some implementations, the vapor cell system is able to sense one or more RF pulses that are configured according to a pulse compression protocol (e.g., a Barker encoding scheme).

Rydberg vapor-based sensors are traditionally understood to be square law detectors in which the phase of an RF field cannot be readily detected without additional sensing techniques. Such techniques may include the use of an RF local oscillator with a Rydberg vapor-based sensor or the construction of an interferometer based on the internal electronic structure of an atom or molecule. However, both techniques have proven to have slow readout compared to expected communication data rates and the requirements for radar applications. The belief that Rydberg vapor-based sensors are square law detectors only holds true if sensing is limited to the steady state behavior of the vapor's response (e.g., response of atoms or molecules in the vapor). In contrast, transient behavior can be used to sense phase changes through the conversion of phase to amplitude response. The phase to amplitude conversion occurs because electromagnetically induced transparency (EIT) and electromagnetically induced absorption (EIA) can both be coherent processes that depend on the phase of the driving fields (e.g., the RF field and laser fields), one of which is the target RF field being sensed.

Under EIT or EIA conditions, a phase change of the target RF field causes a change in the probe laser transition polarization of the vapor sample (e.g., the atomic or molecular sample). The change in RF phase induces a change in the probe laser transmission. The transient response, which can induce both additional absorption and transmission phenomena, is due to the vapor equilibrating through optical pumping. Under conditions where the absorption line is Lorentzian, like in a three-photon readout scheme, detuning can be used to introduce a fixed phase output, thereby allowing full $2\pi$ phase detection. For readout and preparation schemes where the vapor response is Doppler limited, the phase is averaged more, reducing this capability. However, the phase change detection is nevertheless preserved in the Doppler-limited cases.

In some implementations of what is described here, vapor cell sensors are configured to produce a phase modulated signal during transient phase detection, which may be output from the vapor cell sensors as an optical signal. The phase modulated signal can be very sensitive to the frequency of the carrier RF wave. A laser configuration where the lasers are on resonance with the Rydberg atom or molecules in the vapor allow the vapor cell sensors to exhibit a phase-to-amplitude response that is, for example, symmetric to a +180-degree and a −180-degree phase change. If the incident RF wave (e.g., a microwave) is detuned from resonance, such as by the Doppler effect, then the response is not symmetric. Therefore, a radar pulse that is phase modulated by 180 degrees will exhibit an asymmetric response to the phase modulation for a moving target. If the target is moving in one direction, the response will be greater for the +180-degree phase shift, while if the target is moving in the other direction, the response will be greater for the −180-degree phase change. Other types of phase-modulated pulses can be used for the detection of the velocity of a moving target, such as a 90-degree phase change. In some implementations, the vapor cell sensors can detect velocities from those of a moving car to those well above that of a hypersonic vehicle. Multiple channels where the lasers are detuned from each other can be used to obtain better sensitivity by using several measurement channels or by favoring specific regions of Doppler shift.

In some implementations, a system for sensing RF electromagnetic fields, such as from an RF wave or RF pulse, may include one or more vapor cell sensors connected to a laser control and signal processing system. Examples of such vapor cell sensors include a metrology vapor cell or a photonic crystal receiver. The system may have a focusing element (e.g., a dish to collect and focus RF fields) to make the vapor cell sensors more sensitive to received RF waves or pulses. In certain cases, the signal processing system may acquire a time-dependent analog signal from the one or more vapor cell sensors via the principles of Rydberg vapor-based RF electric field sensing. The RF electric fields may, for example, have frequencies between 1 MHz-300 GHz. The analog signal may be digitized and stored in a digital format. The digitized signal may, in certain cases, also be run through a response template of the signal processing system that corresponds to the expected radar or communications pulses. Multiple response templates are possible. The response template may allow the signal processing system to obtain both amplitude and phase information of the RF electric fields. Ideally, the response templates are tailored to the atomic or molecular response. During operation of the system, the phase information is carried in the transient response of the one or more vapor cell sensors while the amplitude information is associated with the steady-state signal. The response templates can be applied in a massively parallel fashion using, for example, field programmable gate arrays (FPGAs) or graphics processing units (GPUs). Such capability of the signal processing system allows for very sensitive read-out of Doppler shifts over a broad range of velocities, e.g., velocities of moving objects via the Doppler shifts, by Rydberg vapor-based sensors.

In many RF applications, it is desirable to determine one or more properties of an RF electromagnetic wave, such as a power (e.g., amplitude), a frequency, or a phase. For Rydberg vapor-based sensing, detection of an RF phase with sufficient speed to meet the encoding timescales of a communication or radar application can be challenging. Various approaches can be used with Rydberg vapor-based sensors to overcome these challenges. In some approaches, a Rydberg vapor-based sensor may be paired with an RF reference (e.g., a local RF oscillator) to beat against a target RF wave or field. However, when such an approach is used, the readout of the resulting signal is often slower, and generation of the RF local oscillator can limit the broad bandwidth offered by the Rydberg vapor-based sensor. Moreover, this approach can increase scattering of the target RF wave and sacrifice electromagnetic transparency. In other approaches, an interferometer may be constructed within the atomic or molecular energy level structure that is sensitive to the phase of a target RF wave. However, when such an approach is used, the readout of the resulting signal may be too slow to detect phase modulation in radar or communications pulses. Moreover, such an approach may require all lasers involved in the detection process to be phase stabilized, which complicates their configuration and control. Some approaches utilize a two-photon RF detection process that can limit detection sensitivity. However, all the aforementioned approaches utilize the steady-state dynamics of the atom or molecule in the vapor after it is tailored for RF reception. In the steady state, the EIT or EIA processes used for Rydberg vapor-based sensors are virtually insensitive to phase, because Rydberg vapor-based sensors configured in this manner behave as a square law detector. In other words, they depend on the square root of the absolute square of the target RF electromagnetic field. They can utilize a local oscillator or reference to detect phase.

EIT/EIA-like processes can be coherent processes, e.g., they can depend on the relative phases of the driven off-diagonal elements of a density matrix describing the process. The density matrix elements may be complex valued. When the atomic or molecular system experiences a phase change, it must re-equilibrate to reach the steady state, such as by adapting to the phase change. Consequently, the transient response is sensitive to changes in phase of any of the fields interacting with the atom or molecule (e.g., RF fields, laser fields, etc.). Because the laser fields are narrow bandwidth and stabilized to a reference, their phase is relatively stable. This stability can be further increased by using, for example, a co-linear Doppler-free three-photon readout and preparation scheme where the EIT/EIA signal is Lorentzian. The phase of the RF field is also generally stable as demonstrated by its narrow spectral bandwidth. If the RF electromagnetic wave changes its phase abruptly due to a phase encoding in the incoming wave, it induces a transient response that can be used to determine the phase change, as shown in FIG. 1. In some variations, the transients are fast on the scale of a pulse width (e.g., on the order of microseconds). Moreover, the signal may be strong. As such, sensing using transient responses can allow for the fast readout of phase, often in timescales less than 1 µs. Such fast readout can allow real-time decoding of an incoming RF signal using digital signal processing after the analog photodetector output has been digitized.

FIG. 1 presents a series of graphs that show an example simulated response of a two-laser EIT Rydberg vapor-based sensor to an amplitude-modulated (left) and phase-modulated (right) RF electromagnetic field. In this example, the RF electromagnetic field is defined by an RF pulse, as shown in the top graphs of FIG. 1. Moreover, the amplitude and phase modulations are based on an electric field component of the RF pulse. The change in the probe laser density matrix element ($\sigma_{12}$) is shown. This matrix element is proportional to the dipole moment of the probe laser transition and thus the absorption of the probe laser. The parameters for the simulation are shown in the inset of the upper left graph.

Figure 2A:
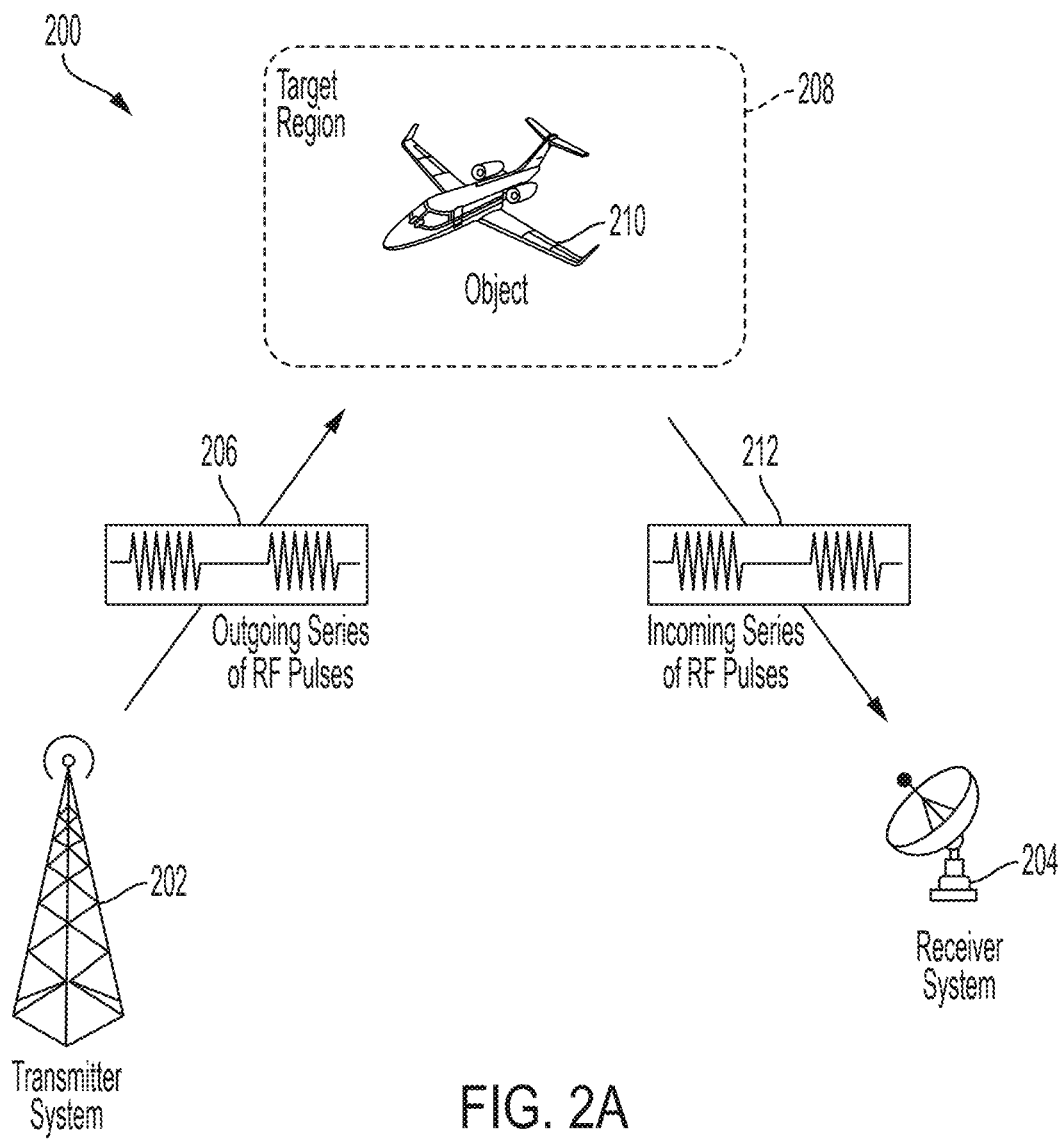
FIG. 2A is a schematic diagram of an example radar system.

Now referring to FIG. 2A, a schematic diagram is presented of an example radar system 200. The example radar system 200 may, for example, be configured to sense radar signals (e.g., RF pulses) using the transient response of a Rydberg vapor-based sensor. The example radar system 200 includes a transmitter system 202 and a receiver system 204. The transmitter system 202 is configured to transmit an outgoing series of RF pulses 206 toward a target region 208. The outgoing series of RF pulses 206 have a reference phase modulation, and the target region 208 may, in certain cases, have an object 210 therein (e.g., an airplane, precipitation, etc.). The receiver system 204 is configured to receive an incoming series of RF pulses 212 that is based on the outgoing series of RF pulses 206 after passing through the target region 208. For example, the outgoing series of RF pulses 206 may produce the incoming series of RF pulses 212 after scattering or reflecting off the object 210. As another example, the outgoing series of RF pulses 206 may produce the incoming series of RF pulses 212 passing through the target region 208 but not encountering the object 210 (e.g., the object 210 is not present in the target region 208).

In certain situations, the outgoing series of RF pulses 206 may interact with the object 210, such as by scattering or reflecting from the object 210. This interaction may alter one or more properties of the outgoing series of RF pulses 206 (e.g., alter a direction, an amplitude, a phase, a frequency, etc.). For example, the interaction may induce a Doppler shift in the outgoing series of RF pulses 206. Although FIG. 2A depicts the radar system 200 in the context of a single transmitter system 202 and a single receiver system 204 (e.g., a bistatic radar system), other configurations are possible. For example, the example radar system 200 may correspond to a multi-static radar system that includes multiple instances of the receiver system 204.

In some implementations, the reference phase modulation defines a pattern of phase changes in one or more of the outgoing series of RF pulses 206. The pattern of phase changes may serve as a basis for phase changes in the incoming series of RF pulses 212. For example, the outgoing series of RF pulses 206 may be scattered from the object 210 to produce the incoming series of RF pulses 212. In these cases, the pattern of phase changes may be altered in whole or in part to produce phase changes for the incoming series of RF pulses 212. In some instances, the pattern of phase changes is shared in common by all of the outgoing series of RF pulses 206. In some implementations, the pattern of phase changes includes a pair of phase changes that are equal in magnitude but opposite in sign (e.g., +90° and −90°). The pair of phase changes may repeat successively to define the pattern of phase changes.

Figure 2B:
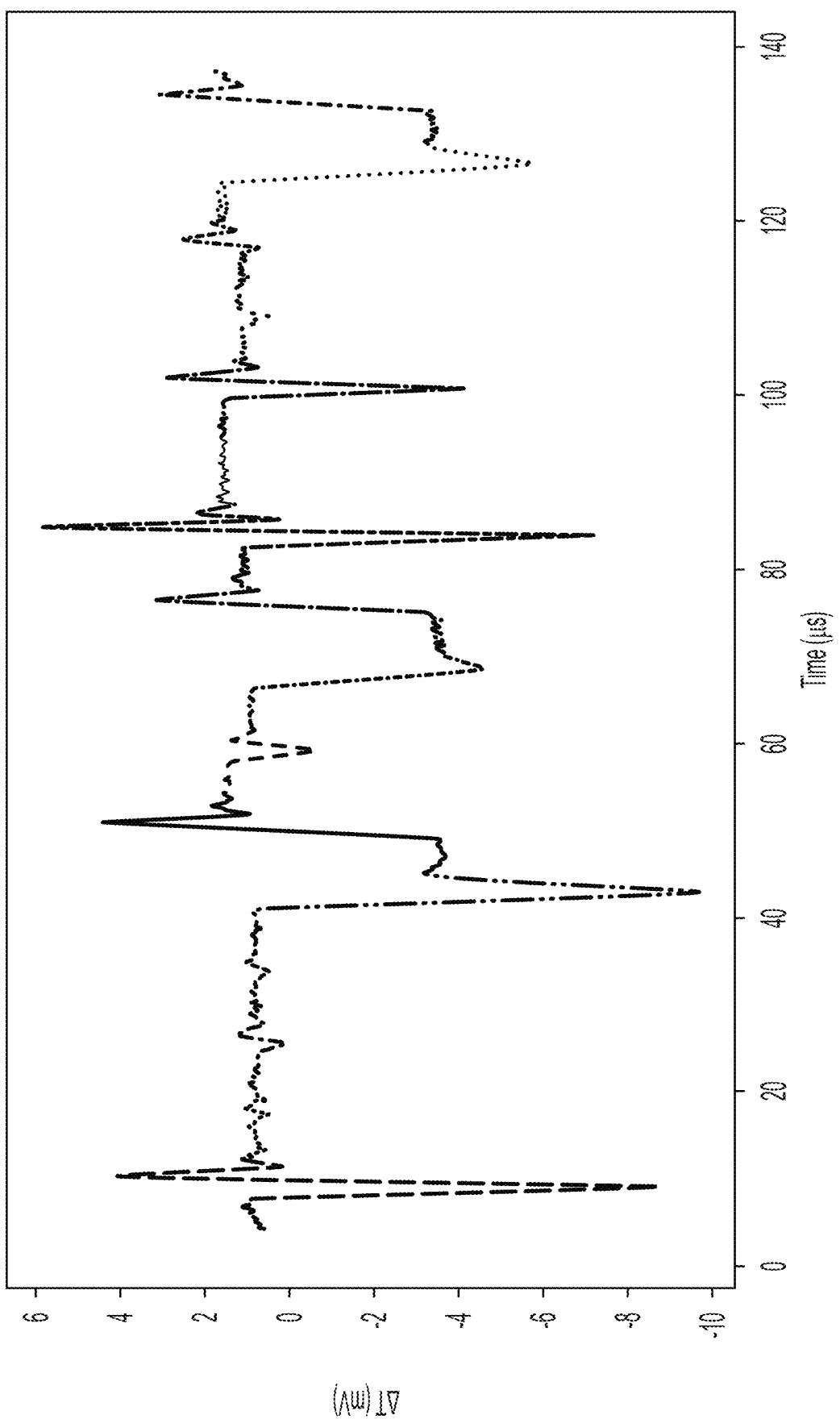
FIG. 2B is an example sequence of sub-pulses for an RF pulse that is transmitted by the example radar system 200 of FIG. 2A.

In some implementations, each of the outgoing series of RF pulses 206 is divided into a sequence of sub-pulses that have respective phases. The sub-pulses extend successively from the beginning of a single RF pulse to the end of the single RF pulse. In these implementations, the phase of each sub-pulse is configured by the reference phase modulation to define a pattern of phases in the sequence of sub-pulses (e.g., $\phi$=+90°, −90°, +90°, −90°, . . . ). The pattern of phases may thus also define a pattern of phase changes between adjacent sub-pulses in the sequence (e.g., $\Delta\phi$=−180°, +180°, −180°, . . . ). In some implementations, the phases of the sub-pulses are defined by the reference phase modulation according to a protocol, such as a pulse compression protocol (e.g., a Barker encoding scheme). FIG. 2B presents an example sequence of sub-pulses for an RF pulse that is transmitted by the example radar system 200 (e.g., transmitted by the transmitter system 202). The example sequence of sub-pulses has respective phases that are defined by a quadrature amplitude modulation (QAM) encoding scheme. The example sequence of sub-pulses has a sub-pulse width of about 8.3 µs and may define (or be part of) a single RF pulse in the outgoing series of RF pulses 206.

The receiver system 204 includes systems for processing the incoming series of RF pulses 212. For example, and with reference to FIG. 2C, the receiver system 204 may include a vapor cell system 214 and a signal processing system 222. The vapor cell system 214 includes a vapor 216 and is configured to produce output signals 218 that are based on laser signals 220 and the incoming series of RF pulses 212 interacting with the vapor 216. The signal processing system 222 is configured to receive the output signals 218 and perform operations that include generating, based on the output signals 218, response data that represents a response of the vapor 216 to the laser signals 220 and the incoming series of RF pulses 212. The response data includes transient response data that represents one or more transient responses of the vapor 216 to respective phase changes in the incoming series of RF pulses 212. The respective phase changes are based on the reference phase modulation of the outgoing series of RF pulses 206.

The operations of the signal processing system 222 also include determining, based on the transient response data, a Doppler shift in the incoming series of RF pulses 212. The Doppler shift results from the outgoing series of RF pulses 206 interacting with the object 210 in the target region 208. However, in certain cases, the Doppler shift may be zero, such as when no object is present in the target region 208 or the outgoing series of RF pulses 206 passes through the target region 208 without interacting with the object 210. The operations additionally include determining a property of the object 210. For example, the signal processing system 222 may determine a velocity of the object 210 based on the Doppler shift. As another example, the signal processing system 222 may also determine a distance of the object 210 from the receiver system 204 based on the response data (and possibly also the Doppler shift). Other properties are possible.

In some implementations, the signal processing system 222 may rely on a model to determine the velocity of the object 210. For example, the signal processing system 222 may rely on a model that relates the velocity of the object 210 ($v$) to the Doppler shift (DS) using a first order mathematical relationship, such as DS=$|\vec{k}|v$. Here, $\vec{k}$ is the wavevector of the incoming series of RF pulses 212, which has an absolute magnitude of $|\vec{k}|=2\pi/\lambda$. $\lambda$ is the wavelength of the incoming series of RF pulses 212 (e.g., the wavelength of the carrier RF wave).

In many implementations, the vapor cell system 214 includes a vapor cell sensor 224 that is configured to contain the vapor 216. The vapor 216 may include Rydberg states, pairs of which are able to interact with the incoming series of RF pulses 212, thus allowing the vapor 216 to function as a Rydberg vapor. For example, the vapor 216 may include one or both of a vapor of Rydberg atoms (e.g., Rb, Cs, etc.) and a vapor of Rydberg molecules (e.g., $H_2$, $I_2$, etc.). In this configuration, the vapor cell sensor 216 may be a Rydberg vapor-based sensor. Examples of vapor cell sensors configured for Rydberg vapor-based sensing are described in U.S. Pat. No. 10,859,981 entitled "Vapor Cells Having One or More Optical Windows Bonded to a Dielectric Body", U.S. Pat. No. 11,112,298 entitled "Vapor Cells for Imaging of Electromagnetic Fields", and U.S. Pat. No. 11,054,453 entitled "Photonic-Crystal Vapor Cells for Imaging of Electromagnetic Fields".

In some implementations, the vapor 216 includes a plurality of electronic states that define a ladder of electronic states. For example, FIG. 2D presents a schematic diagram of an example set of electronic states 240 for a vapor of Rb atoms. The example set of electronic states 240 includes first and second electronic states 242a, 242b and first and second Rydberg electronic states 244a, 244b. These states are labeled in FIG. 2B using spectroscopic notation—i.e., $5S_{1/2}$, $5P_{3/2}$, $53D_{3/2}$, and $54P_{3/2}$, respectively—that is applicable to Rb atoms. The first electronic state 242a, the second electronic state 242b, and the first Rydberg electronic state 244a are progressively higher in energy and define a ladder of electronic states. Moreover, the second Rydberg electronic state 244b is lower in energy than the first Rydberg electronic state 244a. However, in some implementations, the second Rydberg electronic state 244b may be higher in energy than the first Rydberg electronic state 244a.

The example set of electronic states 240 defines electronic transitions of the vapor of Rb atoms. For example, the energy gap between the first and second electronic states 242a, 242b define a first optical electronic transition 246a. Similarly, the energy gap between the second electronic state 242b and the first Rydberg electronic state 244a defines a second optical electronic transition 246b. The first and second optical electronic transitions 246a, 246b may interact with (e.g., absorb) optical signals, such as laser signals from a laser system. In some variations, the first and second optical electronic transitions 246a, 246b correspond to probe and coupling optical transitions that can interact with, respectively, probe and coupling laser signals. As another example, the energy gap between the first and second Rydberg electronic states 244a, 244b may define a Rydberg electronic transition 248 that interacts with (e.g., absorbs) an RF electromagnetic field, such as one associated with an RF pulse.

In FIG. 2D, the example set of electronic states 240 is depicted as having four electronic states, with two being Rydberg electronic states. However, other numbers and combinations of electronic states and Rydberg electronic states are possible. For example, FIG. 2E presents a schematic diagram of an example set of electronic states 260 for a vapor of Cs atoms. The example set of electronic states 260 includes a third electronic state 242c such that the first electronic state 242a, the second electronic state 242b, the third electronic state 242c, and the first Rydberg electronic state 244a are progressively higher in energy (e.g., define a ladder of electronic states). The energy gap between the second and third electronic states 242b, 242c defines a third optical electronic transition 246c that is configured to interact with (e.g., absorb) optical signals, such as laser signals from a laser system. In FIG. 2E, the second Rydberg electronic state 244b is higher in energy than the first Rydberg electronic state 244a. However, in some implementations, the second Rydberg electronic state 244b may be lower in energy than the first Rydberg electronic state 244a. In some variations, the first optical electronic transition 246a in FIG. 2E corresponds to a probe optical transition that can interact with a probe laser signal. Moreover, the second and third optical electronic transitions 246b, 246c in FIG. 2C correspond to, respectively, first and second coupling optical transitions that can interact with first and second coupling laser signals.

In some implementations, the vapor cell system 214 includes a laser system 226 that is optically coupled to the vapor cell sensor 224, such as through free space or through an optical fiber assembly. The laser system 226 is configured to generate the laser signals 220, which are transmitted to the vapor cell sensor 224. For example, the laser system 226 may be configured to generate a probe laser signal 220a and a coupling laser signal 220b that are guided by optical fibers 228 to interact with the vapor 216 of the vapor cell sensor 224. The probe laser signal 220a may have a frequency that is matched to (e.g., is resonant or near resonant with) a frequency of a probe optical transition of the vapor 216, thereby allowing the probe laser signal 220a to interact with the probe optical transition. Similarly, the coupling laser signal 220b may have a frequency that is matched to (e.g., is resonant or near resonant with) a frequency of a coupling optical transition of the vapor 216, thereby allowing the coupling laser signal 220b to interact with the coupling optical transition.

Figure 2C:
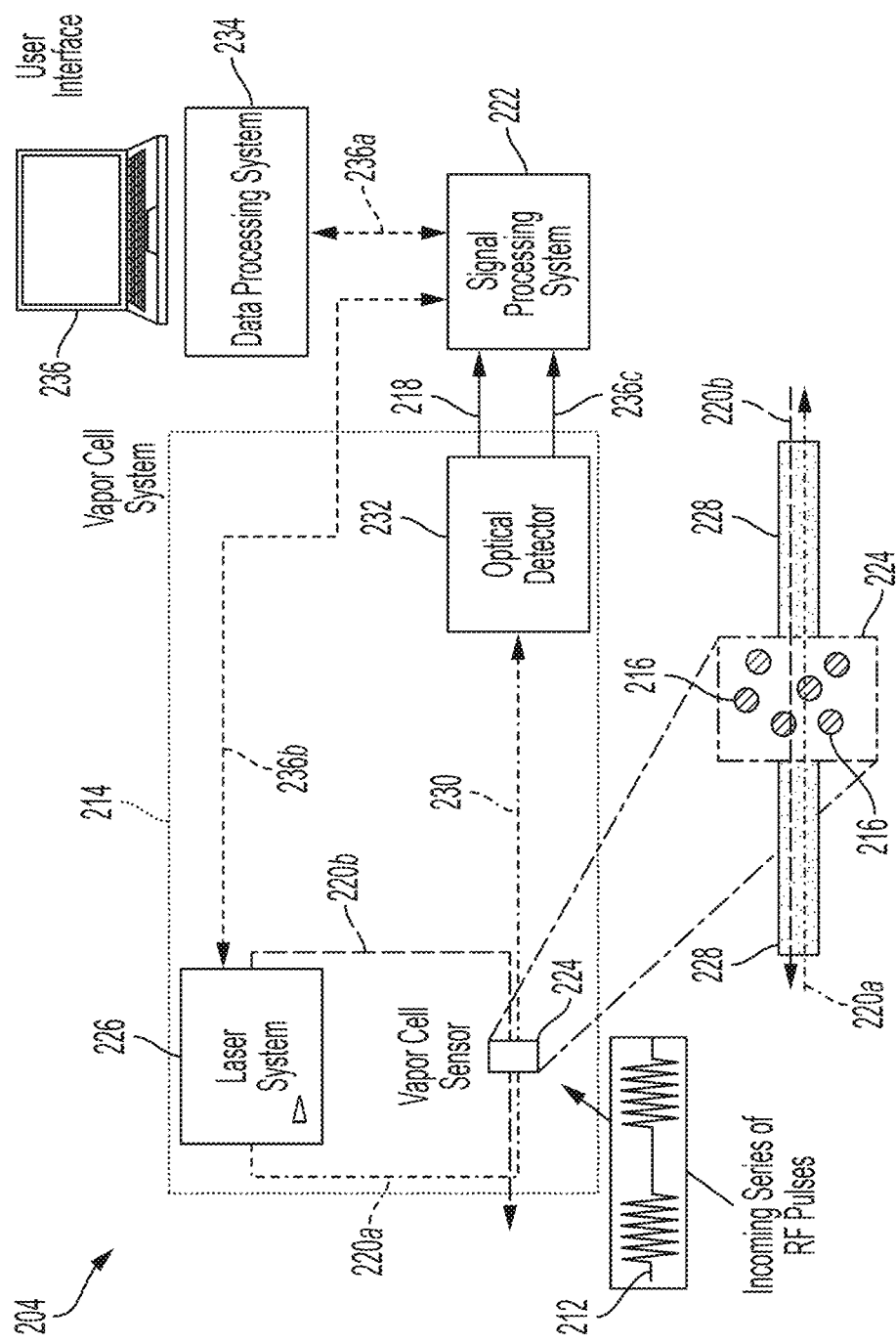
FIG. 2C is a schematic diagram of an example receiver system of the example radar system of FIG. 2A.
Figure 2D:
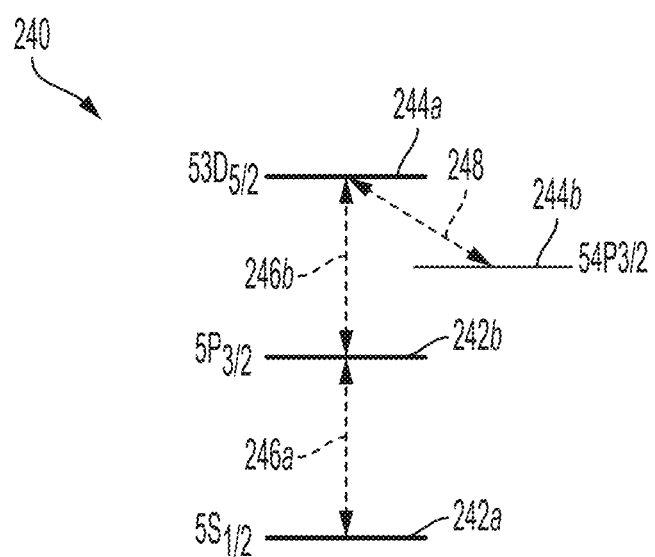
FIG. 2D is a schematic diagram of an example set of electronic states for a vapor of Rb atoms.
Figure 2E:
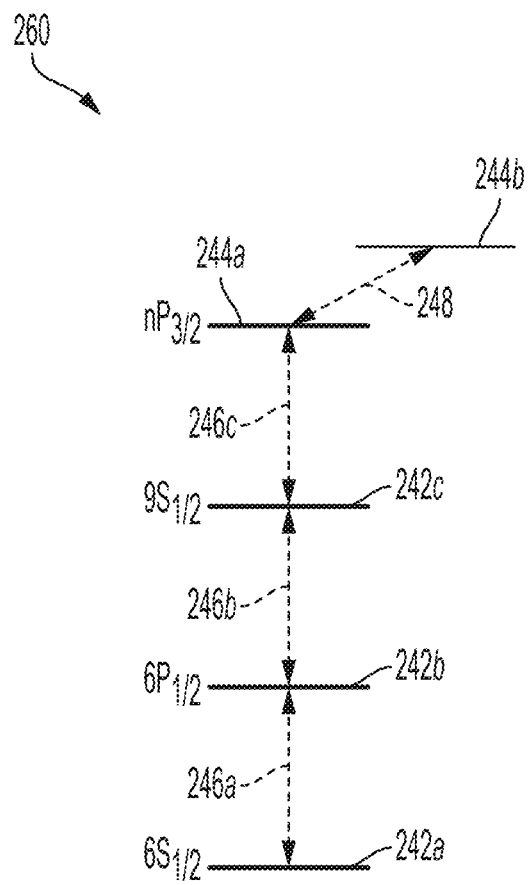
FIG. 2E is a schematic diagram of an example set of electronic states for a vapor of Cs atoms.

FIG. 2C depicts two laser signals 220 defined by, respectively, the probe and coupling laser signals 220a, 220b. However, other numbers of laser signals 220 are possible (e.g., three laser signals). For example, the coupling laser signal 220b may be a first coupling laser signal, and the laser signals 220 may include a second coupling laser signal. The second coupling laser signal may have a frequency that is matched to (e.g., is resonant with or near resonant with) a frequency of a second coupling optical transition of the vapor 216, thereby allowing the second coupling laser signal to interact with the second coupling optical transition. FIG. 2C also depicts the two laser signals 220 counter-propagating through the vapor 216 along opposing optical paths. However, other optical paths are possible. Examples of various configurations of laser signals and their interactions with a vapor having Rydberg states are described further in U.S. Pat. No. 10,509,065 entitled "Imaging of Electromagnetic Fields".

The vapor cell sensor 224 is configured to generate optical signals 230 in response to receiving the laser signals 220. The optical signals 230 may be defined by one of the laser signals 220 after interacting with the vapor 216, such as by passing through the vapor 216 to illuminate the vapor 216. For example, the optical signals 230 may be defined by the probe laser signal 220a after passing through the vapor 216 and interacting with a probe optical transmission of the vapor 216. Simultaneously, the coupling laser signal 220b passes through the vapor 216 and interacts with a coupling optical transmission of the vapor 216. The probe and coupling laser signals 220a, 220b illuminate respective volumes of the vapor 216 that overlap in whole or in part. In certain cases, this overlap region includes the entirety of the vapor 216. The incoming series of RF pulses 212 also enters the vapor 216 and interacts with a Rydberg electronic transition of the vapor 216 in the overlap region. This latter interaction, if present, may alter an optical property of the probe laser signal 220a, such as an its intensity, frequency, polarization, or phase. Combinations of altered optical properties are possible.

The optical signals 230 may represent a response of the vapor 216 to the incoming series of RF pulses 212. In some implementations, the response of the vapor 216 includes one or more transient responses. The one or more transient responses may result from respective phase changes in the incoming series of RF pulses 212. In certain cases, the one or more transient responses occur at respective leading pulse edges of the incoming series of RF pulses 212. In some implementations, the response of the vapor 216 includes one or more steady-state responses. The one or more steady-state responses may result from respective amplitude changes in the incoming series of RF pulses 212. In certain cases, the one or more steady-state responses occur at respective trailing pulse edges of the incoming series of RF pulses 212. However, under certain conditions, the vapor 216 may experience a response to changes in other properties, such as a change in a frequency of the incoming series of RF pulses 212, a polarization of the incoming series of RF pulses 212, and so forth.

In some implementations, the vapor cell system 214 includes an optical detector 232 that is optically coupled to the vapor cell sensor 224 to receive the optical signals 230, such as through free space or through an optical fiber assembly. The optical detector 232 is configured to generate the output signals 218 in response to receiving the optical signals 230. The output signals 218 may represent one or more optical properties of the optical signals 230, such as respective intensities of the optical signals 230. For example, the optical signals 230 may be based on the probe laser signal 220a after passing through the vapor 216, and the optical detector 232 may include a photodetector that is configured to generate an electrical signal in response to measuring an intensity of the probe laser signal 220a after passing through the vapor 216. The photodetector may generate multiple electrical signals that represent respective intensities of the probe laser signal 220a over time. However, other optical properties of the optical signals 230 are possible, such as a frequency of the optical signals 230, a polarization of the optical signals 230, and a phase of the optical signals 230. Combinations of optical properties are also possible.

In some implementations, the optical detector 232 includes one or more optical elements (e.g., lenses, mirrors, polarizers, filters, gratings, beam splitters, etc.) that can be controlled to manipulate the optical signals 230. Such manipulation may allow the optical detector 232 to measure a target optical property of the optical signals 230, such as via a photodetector. In some implementations, the optical detector 232 includes a photodetector that is configured to measure a target optical property of the output optical signal 212, such as an intensity of the optical signals 230 at a specific frequency (or within range of frequencies). In these implementations, the optical detector 232 may include multiple photodetectors, each configured to measure a different target property of the optical signals 230.

The signal processing system 222 is configured to receive the output signals 218 from the vapor cell system 214 (e.g., from the optical detector 232) and may include analog electronics, digital electronics, or both, for processing the output signals 218 once received. For example, the signal processing system may include one or more processors and a memory that stores instructions. In these implementations, the instructions are configured to cause the one or more processors to perform operations that include generating the response data, determining the Doppler shift, and determining a property of the object 210 (e.g., a velocity). Other operations are possible. In some implementations, the optical detector 232 is configured to generate analog signals and the signal processing system 222 is configured to convert the analog signals into digital signals for processing. In these implementations, the signal processing system 218 may include circuits for the parallel processing of digital signals (e.g., FPGAs, ASICs, GPUs, etc.).

In some implementations, the example radar system 200 includes a data processing system 234 in communication with the signal processing system 222 through a communication channel 236a. FIG. 2C depicts the data processing system 234 as part of the receiver system 204. However, in some instances, the data processing system 234 is external to the receiver system 204 (e.g., part of the transmitter system 202, part of a data fusion center, etc.). The communication channel 236a may be defined, for example, by a wired connection (e.g., an Ethernet connection) or a wireless connection (e.g., a WiFi connection). The data processing system 234 is configured to receive the data from the signal processing system 222, such as for display, for storage, for further processing, or some other type of operation. The data processing system 234 may include a computer that serves as a user interface 236 of the example radar system 200. Examples of the computer include a desktop computer, a workstation, a server, a laptop, a tablet, a mobile device, and so forth. The user interface 236 is configured to allow a user of the example radar system 200 to view the data from the signal processing system 222. However, other functionality is possible (e.g., displaying information related to the optical detector 232, controlling the optical detector 232, etc.). The data processing system 234 may also be configured to control the signal processing system 222, such as by using the communication channel 236a therebetween to send control signals (e.g., instructions, data, etc.) to the signal processing system 222. However, in certain configurations, data processing system 234 may be configured to control other components of the example radar system 200.

In some implementations, the example radar system 200 includes a communication channel 236b between the signal processing system 222 and the laser system 226. In these implementations, the signal processing system 222 may be configured to control the laser system 226, thereby allowing the signal processing system 222 to control an optical property of one or more laser signals 220 generated by the laser system 226. Such control may include altering or maintaining the optical property, and examples of the optical property include an amplitude (e.g., an intensity), a frequency, a polarization, and a phase of the one or more laser signals 220. Combinations of optical properties are possible.

In some implementations, the example radar system 200 includes a communication channel 236c between the signal processing system 222 and the optical detector 236. In these implementations, the signal processing system 222 may be further configured to control the optical detector 236, thereby allowing the optical detector 236 to measure one or more target properties of the optical signals 230. Such control may include controlling optical elements of the optical detector 236 to select a target optical property of the optical signals 230. This control may also include controlling one or more photodetectors, each configured to measure a different target optical property. In some implementations, the laser system 226, the optical detector 236, the signal processing system 222, and the communication channels 236a-c are part of the data processing system 234.

Figure 3:
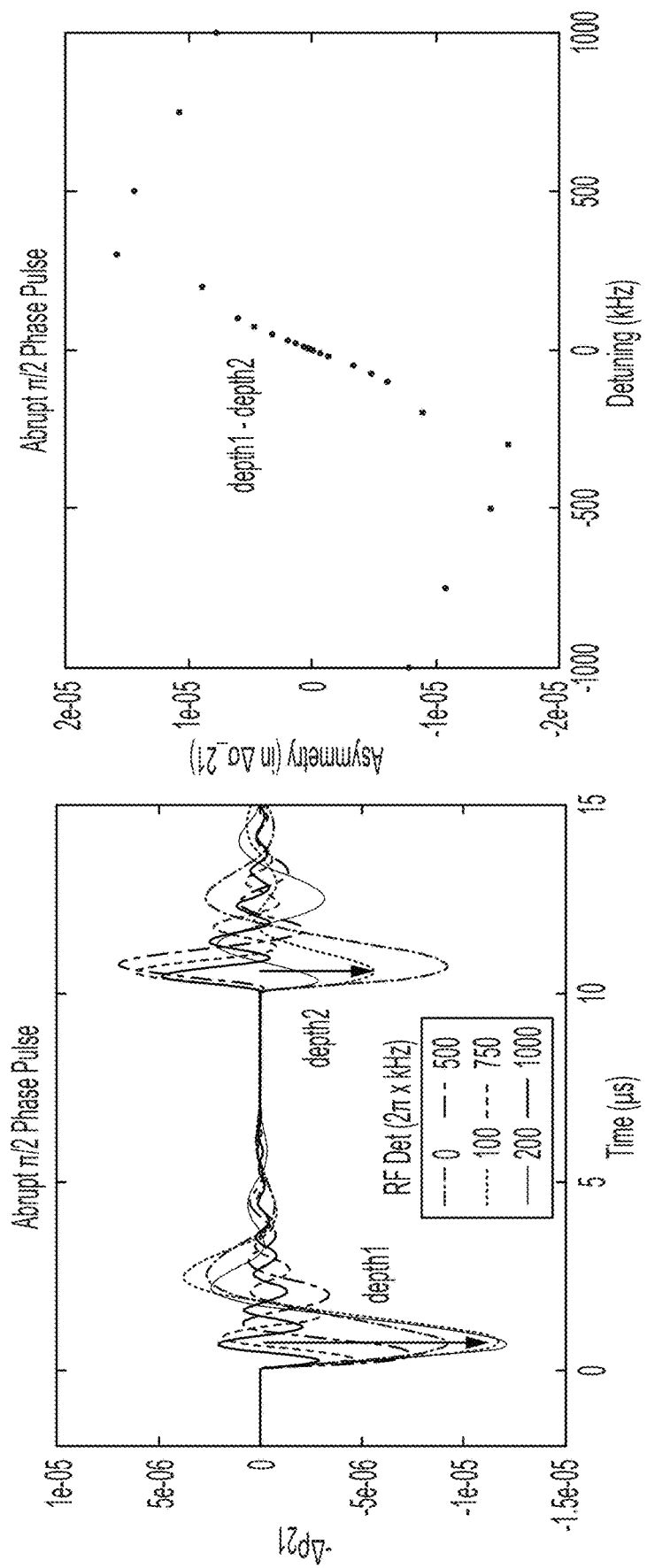
FIG. 3 is a pair of graphs showing an example response of a Rydberg vapor-based sensor, in simulation, to phase modulation.

In some implementations, the example radar system 200 is configured to determine the Doppler shift by analyzing a degree of asymmetry in the response of the vapor 216. FIG. 3 presents a pair of graphs showing an example response of a Rydberg vapor-based sensor, in simulation, to phase modulation. The Rydberg vapor-based sensor may be analogous to the vapor cell sensor 224 described in relation to FIG. 2C. The left and right graphs in FIG. 3 show the response of the Rydberg vapor-based sensor to a 90-degree phase modulated RF pulse which changes between 90-degrees and 0-degrees for its phase, leading to a +90-degree phase change followed by a −90-degree phase change with a period of about 10 μs. The Rydberg vapor-based sensor is held on resonance. The incoming series of RF pulses is detuned from the resonant conditions because of a Doppler shift that results from incoming series of RF pulses scattering from a moving object (e.g., a radar target). The curves in each graph correspond to different Doppler shifts with the left-side graph showing negative velocities and the right-side graph showing positive velocities. The negative velocities are a result of the object moving away from the Rydberg vapor-based sensor, and the positive velocities are a result of the object moving towards the Rydberg vapor-based sensor.

The simulation shows an asymmetry in the response over the pulse period due to the motion of the object. As such, the graphs show that the Doppler shift induces an asymmetry in the response of the Rydberg vapor-based sensor, which can provide an advantage in sensing the RF pulses of an incoming radar signal (e.g., the incoming series of RF pulses 212). An outgoing radar signal (e.g., the outgoing series of RF pulses 206) needs to have phase modulation built into it, and the asymmetry induced by a Doppler shift can allow the Rydberg-based sensor to sense radar signals based solely on phase modulation. The radar signal can also be amplitude modulated, such as using Barker codes or pulse compression techniques. But amplitude modulation is not necessary for the Rydberg vapor-based sensor to detect the radar signal (although the Rydberg-based sensor can sense the radar signal if amplitude modulation is also present).

Now with reference to FIGS. 2A and 2C, the phase changes in the incoming series of RF pulses 212 may, in some implementations, include first and second phase changes, with the first phase change occurring before the second phase change. In these implementations, the transient response data may include first and second subsets of transient response data. The first subset of transient response data represents a first transient response of the vapor 216 to the first phase change, and second subset of transient response data represents a second transient response of the vapor 216 to the second phase change. During operation, the signal processing system 212 may then determine the Doppler shift by generating first and second values based on, respectively, the first and second subsets of transient response data. The first value represents a degree to which the vapor 216 responds to the first phase change, and the second value represents a degree to which the vapor 216 responds to the second phase change. Moreover, the first and second values may allow the signal processing system 212 to determine a degree of asymmetry in the response of the vapor 216, thereby determining a magnitude of the Doppler shift. For example, the signal processing system 212 may calculate a difference between the first and second values, with the difference representing a detuning of the incoming series of RF pulses 212 relative to a Rydberg electronic transition of the vapor 216. This difference may also quantify the degree of asymmetry in the response of the vapor 216. If the difference is zero, the response of the vapor 216 may be symmetric and the Doppler shift may be zero.

In some implementations, the signal processing system 222 determines the velocity of the object 210 using the difference. The magnitude of the velocity may be based on a magnitude of the difference between the first and second values, such as described in relation to FIG. 4. Moreover, a direction of the velocity may be based on a sign of the difference. For example, the direction of the velocity may be determined relative to an incoming direction (e.g., a radial direction) along which the incoming series of RF pulses 212 travels to reach the receiver system 204. A positive difference may correspond to a velocity towards the receiver system 204, and a negative difference may correspond to a velocity away from the receiver system 204.

In many implementations, the incoming series of RF pulses 212 interacts with two Rydberg electronic states of the vapor 216 that define the RF electronic transition. The RF field in steady state modulates the transmission of the probe laser signal 220a passing through vapor 216. The amount of transmission changes for different detunings of the probe laser signal 220a or the coupling laser signal 220b in the vapor cell system 214 under EIT or EIA conditions. The RF field detuning can also change the detuning of the probe laser signal 220a. The RF detuning may be considered in order to understand the asymmetry in the response to a phase change of $\pi/2$ (e.g., pulse compression with $+\pi/2$ and $-\pi/2$ phase modulation). The detuning of the RF field can be caused by a Doppler shift. On resonance, the dressed excited states (e.g., those resulting from the vapor and the RF field together) are equal mixtures of the lower and upper Rydberg electronic states-one is a symmetric and the other an antisymmetric combination of the two bare Rydberg electronic states. When a detuning exists, the two dressed states are imbalanced combinations of the two Rydberg electronic states. If the phase changes on resonance, the two dressed states change because the phase of the dressing field has changed. The composition of the two states changes until it relaxes to equilibrium, where the states become equal combinations again. If the RF field is off resonance, the same basic evolution takes place but the trajectory of the evolution to equilibrium for each state is different, e.g., the composition of the dressed states in time is different. The composition of the dressed states modulates the EIT/EIA in the vapor 216 so that the transmission of the probe laser signal 220a changes proportionally to the coupling of the Rydberg electronic state that is also optically coupled to the coupling laser signal 220b. The transmission of the probe laser signal 220a through the vapor cell sensor 224 therefore maps out the evolution of the dressed states to equilibrium after a phase change. On resonance, the evolution of the dressed states is the same for a +π/2 or −π/2 phase change because of the equal mixtures of the two Rydberg electronic states. However, for an RF detuning, the evolution is not symmetric for a +π/2 and −π/2 phase change. Similar arguments hold for other magnitudes of phase changes.

Figure 4:
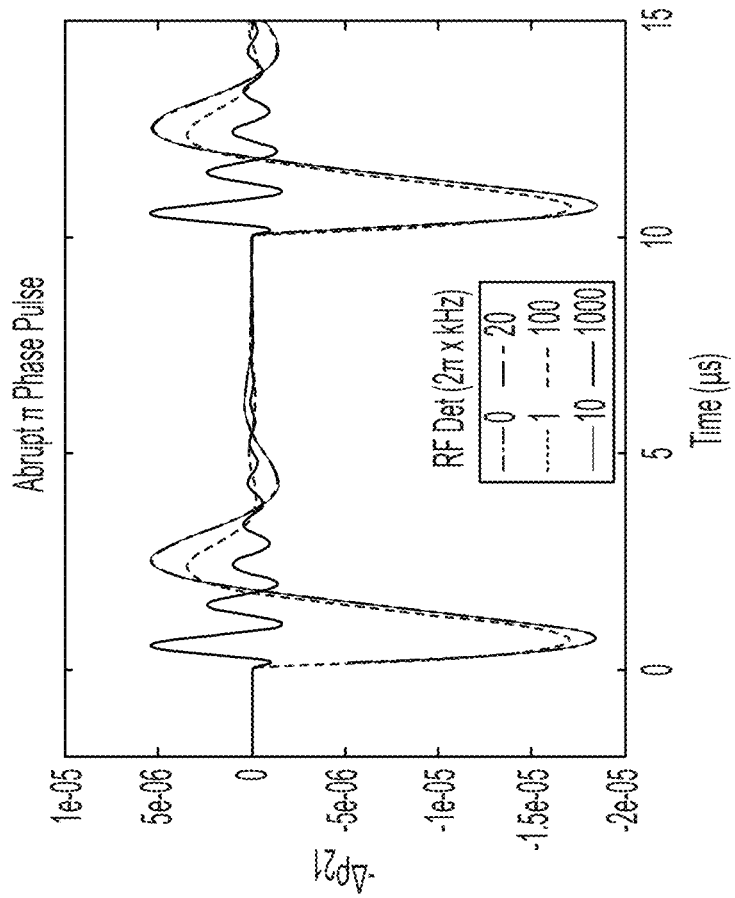
FIG. 4 is a graph and table showing example velocities that can be determined using the Doppler shift response of a Rydberg vapor-based sensor.

Phase detection can be important for radar applications because it is used to detect the velocity of targets, such as through the Doppler shifts that are induced by an object on radar signal. Phase modulation can also be used for pulse compression. In some cases, the systems and methods disclosed herein—e.g., example radar system 200 described in relation to FIGS. 2A-2E—can detect transient phase changes from Doppler shifts in order to determine properties of the target, such as its velocity. In some cases, the systems and methods described here are sensitive over a range of velocities. For example, as shown in FIG. 4, a single Rydberg vapor-based sensor (e.g., a vapor cell sensor) can be used to determine speeds ranging from those typical of cars to those associated with hypersonic vehicles. The left hand of FIG. 4 presents a graph showing simulated examples of Doppler shift responses from a Rydberg vapor-based sensor for a phase modulation of 180 degrees. The graph shows six such responses, each associated with a different velocity (see inset) and transient within a period of about 5-10 μs. The right hand of FIG. 4 presents a table showing examples of Doppler shifts and corresponding velocities of a moving target. The velocities are determined using the Doppler shift response of a Rydberg vapor-based sensor, such as shown in the graph of FIG. 4, and are based on a radar signal having a 10 GHz radio frequency. The velocities are determined using the first order mathematical relationship, $DS=|\vec{k}|v$. Here, $\vec{k}$ is the wavevector of the radar signal, and the wavevector has an absolute magnitude of $|\vec{k}|=2\pi/\lambda$. $\lambda$ is the wavelength of the radar signal, which is about 0.3 m for a radio frequency of 10 GHz. The radar signal interacts with a vapor of the Rydberg vapor-based sensor, as do laser signals from a laser system. The text above the table in FIG. 4 lists the laser parameters.

Rydberg vapor-based sensors can be square law detectors in the steady state. In other words, they can be insensitive to phase when operating in a steady-state condition. However, their transient behavior is not insensitive to phase. A change of phase in an RF electromagnetic field incident on a Rydberg vapor-based sensor can lead to a change in the interference phenomena used to dress a Rydberg atom or molecule. In this case, the Rydberg vapor is sensitive to the RF target signal as well as the readout of the RF target signal. When the phase of the incident RF field changes, the transmission (or analogously the absorption) of the probe laser signal will exhibit large changes, as shown in the graphs of FIGS. 1 and 3. These changes can be of the same size as an amplitude-modulated RF field. The magnitude of the signal depends on the strength of the RF electromagnetic field and its phase change. The phase change and the amplitude can both be used for encoding signals for applications like communications and for Doppler shift detection. The fact that the phase of an RF electromagnetic field can be detected in this way allows for an all-optical method of detecting phase. Moreover, such methods do not require an RF local oscillator. The laser configuration can also be the same as that used for Rydberg vapor-based sensors under EIT/EIA conditions for RF sensing. Additional lasers are not necessary and phase stabilization of the lasers beyond what is required for standard Rydberg atom sensors is not required.

In some implementations, a colinear three-photon readout method may be used to detect the phase of an incident RF electromagnetic field. A three-photon readout method can offer advantages when detecting phases. For example, the signal (e.g., the optical signal 230) in a three-photon readout can avoid negative effects of Doppler averaging. Doppler averaging can result from the motion of atoms or molecules in the vapor of a vapor cell sensor, which can suppress some of the phase effects by averaging them into a single representative value. However, with a three-photon readout method, it is possible to run two or more sensing channels that have a fixed phase relationship, thereby allowing the full 2π phase information to be obtained. During three-photon readout, the detuning from resonance of one channel can be fixed within the spectral line shape of the EIT/EIA resonance to set a phase offset. The detuning from resonance is then compared to the signal on-resonance or at another fixed detuning. This sets two measurement vectors in the complex amplitude-phase plane to measure the full phase angle.

Now referring to FIG. 2C, the vapor cell system 226 may be configured, in some instances, to function as a co-linear three-photon readout system that can set the detuning of one sensing channel (e.g., the coupling laser signal 220b). For example, the laser system 226 may be configured to generate laser signals 220 that include a tunable laser signal (e.g., a tunable instance of the coupling laser signal 220b). In these cases, the signal processing system 222 may be configured to perform operations that include transmitting a control signal to the laser system 226. The control signal instructs the laser system 226 to alter a frequency of the tunable laser signal from an on-resonance frequency, where the tunable laser signal is on-resonance with an optical electronic transition of the vapor 216, to a detuned frequency, where the tunable laser signal is detuned relative to the optical electronic transition of the vapor 216. The transient response data may then be generated when the tunable laser signal is at the on-resonance frequency. Moreover, the response data may include detuned transient response data that is generated when the tunable laser signal is at the detuned frequency.

The vapor cell system 226 may also be configured, in some variations, to function as a co-linear three-photon readout system that can set the detuning of multiple sensing channels (e.g., first and second coupling laser signals). For example, the tunable laser signal may be a first tunable laser signal; the detuned frequency may be a first detuned frequency; and the control signal may be a first control signal. Moreover, the laser signals 220 may include a second tunable laser signal. In these cases, the signal processing system 222 may be configured to perform operations that include transmitting a second control signal to the laser system 226. The second control signal instructs the laser system 226 to alter a frequency of the second tunable laser signal from the on-resonance frequency, where the second tunable laser signal is on-resonance with the optical electronic transition of the vapor 216, to a second detuned frequency, wherein the second tunable laser signal is detuned relative to the optical electronic transition of the vapor 216. The detuned transient response data is generated when the first and second tunable laser signals are at, respectively, the first and second detuned frequencies.

In some variations, vapor cell system 226 may symmetrically detune the two sensing channels from their respective optical electronic transitions. This symmetrical detuning may set two measurement vectors in the complex amplitude-phase plane to measure a full phase angle for the incoming series of RF pulses 212. For example, a first difference between the first detuned frequency and the on-resonance frequency may define a first detuning of the first tunable laser signal. Similarly, a second difference between the second detuned frequency and the on-resonance frequency may define a second detuning of the second tunable laser signal. In these cases, the first and second detunings are equal in magnitude but opposite in sign to symmetrically detune the first and second tunable laser signals about the optical electronic transition of the vapor 216.

In some implementations, the outgoing series of RF pulses 206 have a reference amplitude modulation. The reference amplitude modulation may be used by the signal processing system 222 to help determine the Doppler shift. For example, the response data may further include steady-state response data that represents one or more steady-state responses of the vapor to respective amplitude changes in the incoming series of RF pulses 212. In these cases, the respective amplitude changes are based on the reference amplitude modulation of the outgoing series of RF pulses 206, and the Doppler shift is determined based on both the transient response data and the steady-state response data. In some instances, the reference amplitude modulation defines a pattern of amplitudes for the outgoing series of RF pulses 206. In certain cases, each RF pulse in the outgoing series of RF pulses 206 has an amplitude that is set by the reference amplitude modulation. The pattern of amplitudes may serve as a basis for amplitudes in the incoming series of RF pulses 212. For example, the outgoing series of RF pulses 206 may be scattered from the object 210 to produce the incoming series of RF pulses 212. In these situations, the pattern of amplitudes may be altered in whole or in part to produce amplitudes for the incoming series of RF pulses 212.

In a general aspect, a system for reading out a time-dependent RF signal includes a Rydberg-sensing system, such as the example radar system 200 described in relation to FIGS. 2A-2E. The Rydberg-sensing system may, in certain cases, be a Rydberg atom-sensing system. For example, the Rydberg-sensing system may include a vapor cell sensor whose vapor includes a vapor of Rydberg atoms. The system may also include a photodetector configured to generate an analog signal in response to receiving an optical signal from the vapor cell sensor. In many variations, the analog photodetector signal is converted to a digital signal using a signal processing system. The digital signal may be processed to determine the difference in phase change between different sections of a phase modulated RF pulse using the transient response of the system.

In some implementations, the phase is switched back and forth with a single period over the extent of each RF pulse. Variants that implement detuning to apply known phase shifts, such as described in the context of colinear three-photon readout, can provide more information. There may be advantages to using several different phase modulation patterns over the extent of the RF pulse. In some implementations, digital signal processing is used to analyze the shape of the response, thereby determining the correlation between the vapor response and the Doppler shifts (e.g., effective detunings). Such processes may, for example, include applying response templates to output signals from the optical detector. Amplitude modulation can also be used along with the phase modulation without disturbing the Doppler detection. The amplitude response can be used in conjunction with digital signal processing to better determine the Doppler shifts in the digital signal processing. Other methods of quickly determining the Doppler shifts are possible.

Figure 5:
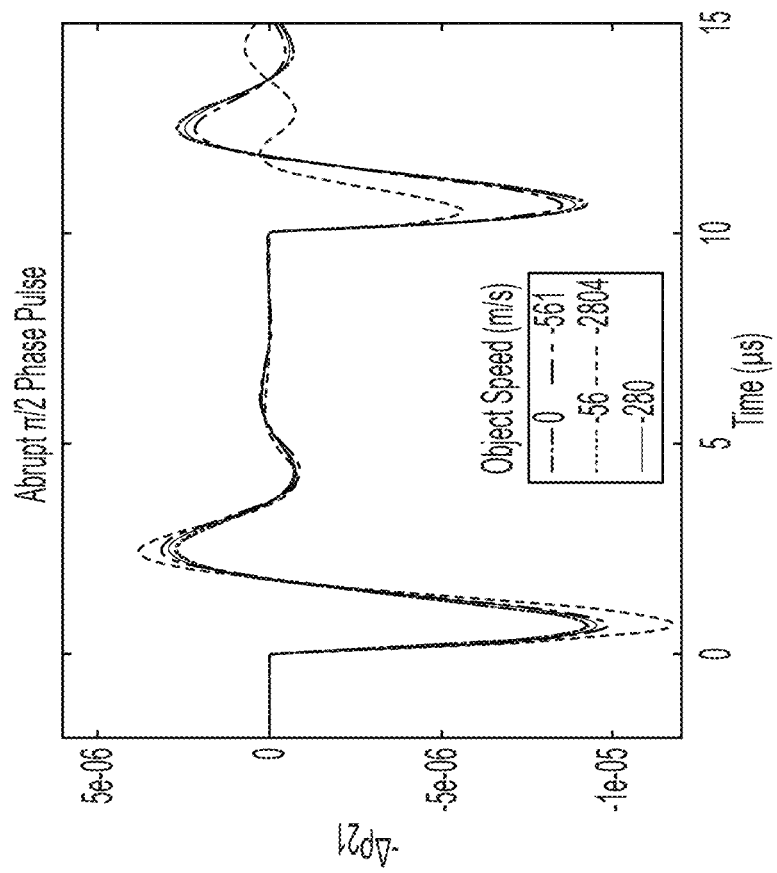
FIG. 5 is a pair of graphs showing an example simulation of how the depths of the response to a phase change can be utilized to determine the Doppler shift over a broad range.
Figure 5:
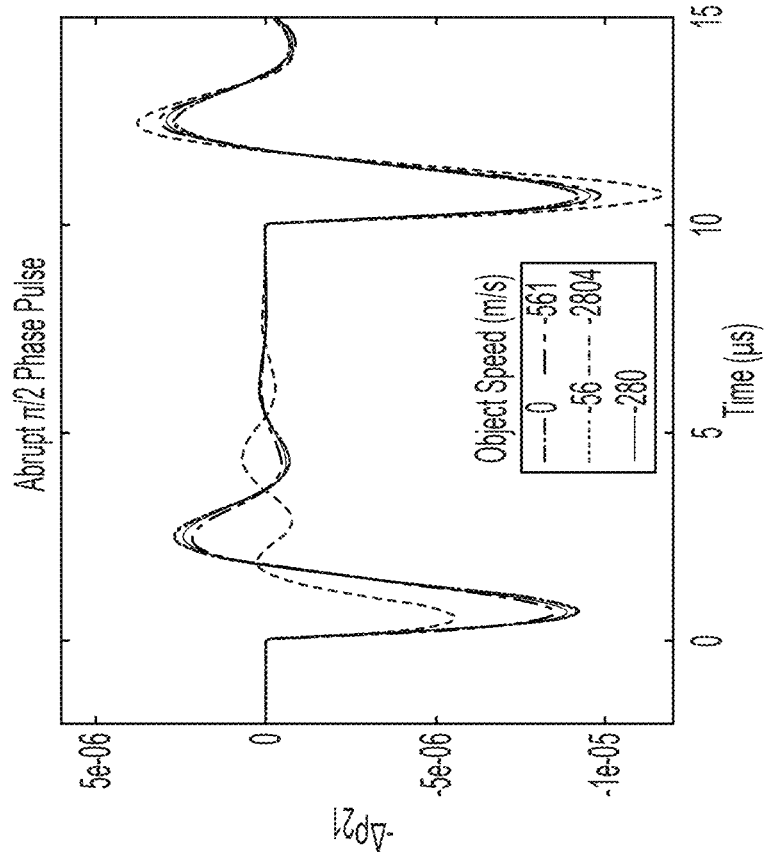

For example, FIG. 5 presents a pair of graphs showing an example simulation of how the depths of the response to a phase change can be utilized to determine the Doppler shift over a broad range. Using such a proxy for the Doppler shifts, rather than the whole response, can allow the resulting data to be processed faster. The left graph of FIG. 5 shows the response of a Rydberg-based vapor cell sensor to different Doppler shifts and defines a proxy for each signal, e.g., the depth of the leading pulse. The right graph of FIG. 5 shows the proxy of the Doppler shift, indicating that the range of Doppler shifts is large, as evidenced by the table in FIG. 4.

In some implementations, a system for reading out a time-dependent RF signal includes a laser system, an optical detector, a signal processing system, a user interface, and at least one vapor cell sensor that is coupled via waveguide (e.g., a fiber optic cable) to the laser system and the optical detector. The system may be analogous to the example radar system 200 described in relation to FIGS. 2A-2E. The vapor cell sensor can have a mounting system and can have virtually any type of configuration, although a vapor cell sensor configured as a photonic crystal receiver may be preferable for radar applications. Examples of photonic crystal receivers for radar applications are described in U.S. Pat. No. 11,137,487 entitled "Radar Systems Using Photonic Crystal Receivers to Detect Target Objects". In some variations, the system includes a focusing device (e.g., a parabolic dish, a focusing lens, etc.) that is configured to receive RF electromagnetic waves or pulses and focus them on the vapor cell sensor. The focusing device may increase the size of the RF signal sensed by the vapor cell sensor.

In some implementations, the laser system includes at least two lasers configured for Rydberg vapor-based sensing (e.g., a probe laser, a coupling laser, etc.). For example, the two lasers may be configured to generate input optical signals for a vapor of Rydberg atoms, a vapor of Rydberg molecules, or both. An output optical signal from the vapor can be generated using EIT or EIA. A sub-Doppler method may be useful for higher spectral resolution in the Autler-Townes regime and higher sensitivity, generally. In general, the less atomic or molecular Doppler shifts resulting from the motion of the atoms or molecules affect the system, the better the phase readout. In some cases, the colinear three-photon readout method can improve phase readout, as described previously.

In some implementations, the lasers are locked to a stable, narrow bandwidth reference such as a frequency comb, interferometer, or atomic or molecular absorption line. To readout the RF signal, such as by generating an output optical signal from the vapor cell sensor, either of the lasers can be scanned or the probe laser can be used to generate a frequency comb in an optical heterodyne setup to look at the response of many different atomic velocity classes. If a frequency comb is used, a real-time spectrum analyzer can be used to detect the signal. The RF signal is time-dependent so the lasers are at fixed frequency for a particular RF pulse (although there may be several or many frequencies simultaneously generated by the lasers and present in the vapor cell sensor at any one time). An electro-optic modulator can be used to introduce multiple frequencies with fixed detunings, such as for fixed, different relatively referenced phase readouts. An example of the use of frequency combs in RF detection is described in U.S. Pat. No. 11,874,311 entitled "Detecting Radio Frequency Electromagnetic Radiation Using Vapor Cell Sensors and Comb Spectra".

In some implementations, the coupling laser of the laser system can be tuned to different Rydberg states of the vapor to target different RF frequencies. Spectral signals within a bandwidth of about 400 MHz of the target frequency can be detected by analyzing the optical spectra (e.g., via an optical detection system). In some variations, the laser system includes a control subsystem that is configured to monitor the lasers and keep them stable. Light in the control subsystem, such as from an optical feedback loop, can be routed via waveguide through all or part of the system. The light can be directed to the vapor cell sensor in free-space or through optical fiber. Feedback to control the lasers, including feed forwards, can be realized using FPGAs, analog electronics, or another processor-based component that can be controlled through a user interface and through autonomous control layers operating in different types of processors. An example of the laser system is described in U.S. Pat. No. 11,658,461 entitled "Tuning the Output of a Laser". This example may be advantageous for use when the system is configured to read out a time-dependent RF signal that has multiple RF frequencies. Another example of the laser system is described in U.S. Pat. No. 11,874,311 entitled "Detecting Radio Frequency Electromagnetic Radiation Using Vapor Cell Sensors and Comb Spectra".

In some implementations, the optical detector includes a photodetector to detect the probe light. The photodetector senses changes in the transmission through the vapor of the vapor cell sensor due to interactions of the RF signal with the vapor. The photodetector may, in certain cases, be configured to output an analog signal. In these cases, the signal processing system converts the analog signal to a digital signal that can be processed on a FPGA, GPU, a computer processor, a specialized hybrid processor, or other type of processor. Combinations of processors are possible. In certain configurations, the signal processing system can store the digital signal as a function of time and run it through one or more templates (e.g., a response template) to identify the periodicity, arrival time, and other properties of incoming, time dependent RF signal, including picking out and/or separating the transient response and the steady-state response of the vapor cell sensor. The steady state response may occur at the backend of the pulse while the transient response may be found at the leading edge of the pulse, as shown in FIG. 6.

Figure 6:
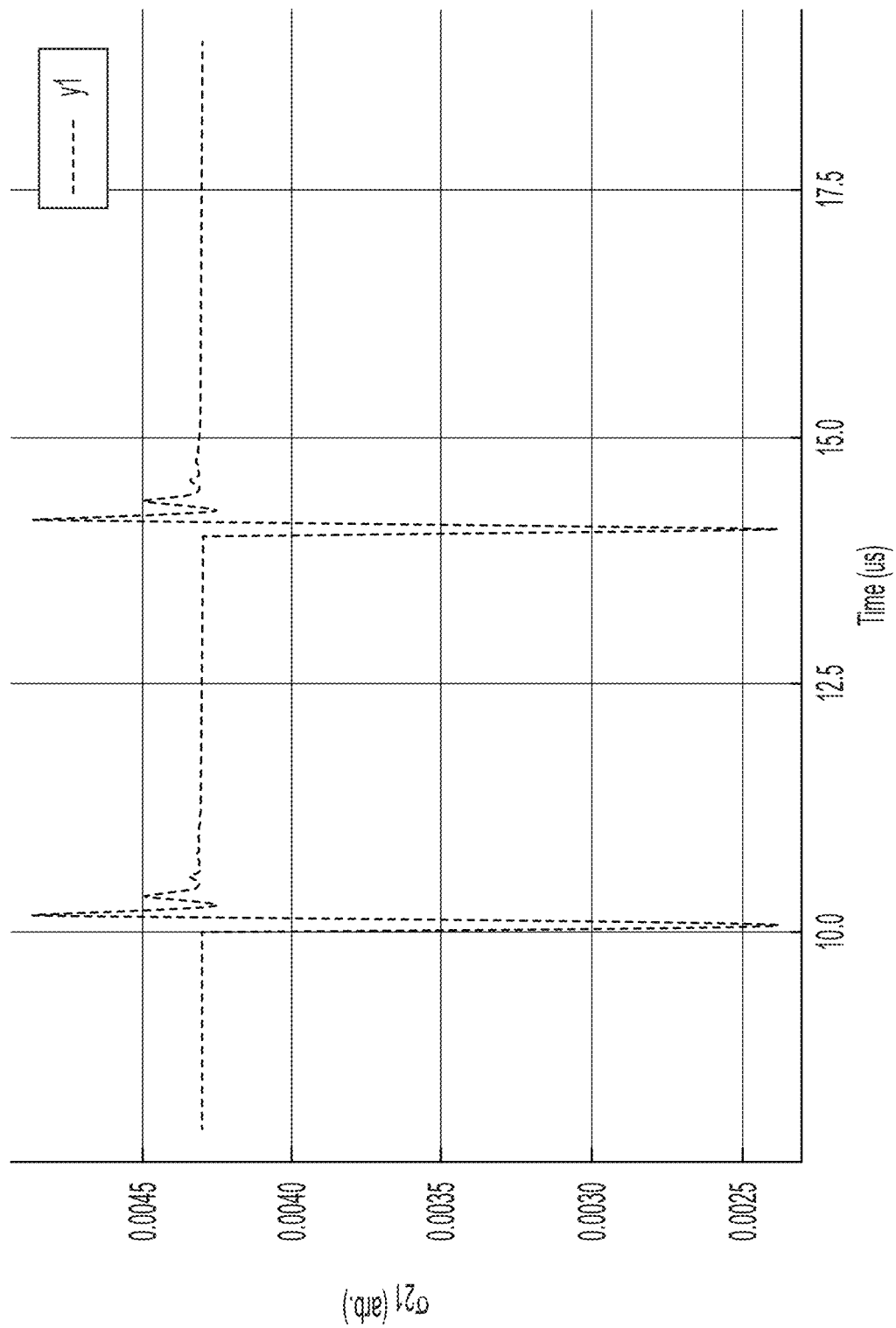
FIG. 6 is a graph showing an example of a time dependent calculation of a transient response.

FIG. 6 presents a graph showing an example of a time-dependent calculation of a transient response. The transient response is simulated, and the RF pulse train shown in FIG. 6 has a temporal width of 4 μs. After 4 μs the phase is shifted by π. The calculation corresponds to a two-photon Rydberg vapor-based sensor read-out. The Rabi frequency of the probe laser is 1 MHz and the Rabi frequency of the coupling laser is 5 MHz. The Rabi frequency of the RF pulse train is 10 MHz. The transition dipole moment (proportional to $\sigma_{12}$) changes are comparable to the overall RF induced changes in the EIT readout signal.

During operation of the signal processing system, the signals can be averaged together over time or acquired in real-time. The signal train can be subjected to Fourier transform analysis or another type of transform such as a wavelet transform in the FPGA or processing unit. The data is available in whole or in part to a user via a user interface, which may, in certain configurations, be part of a control unit of the system. The digital signals can be stored in the control unit for future evaluation in whole or in part, including the calculated data.

Figure 7:
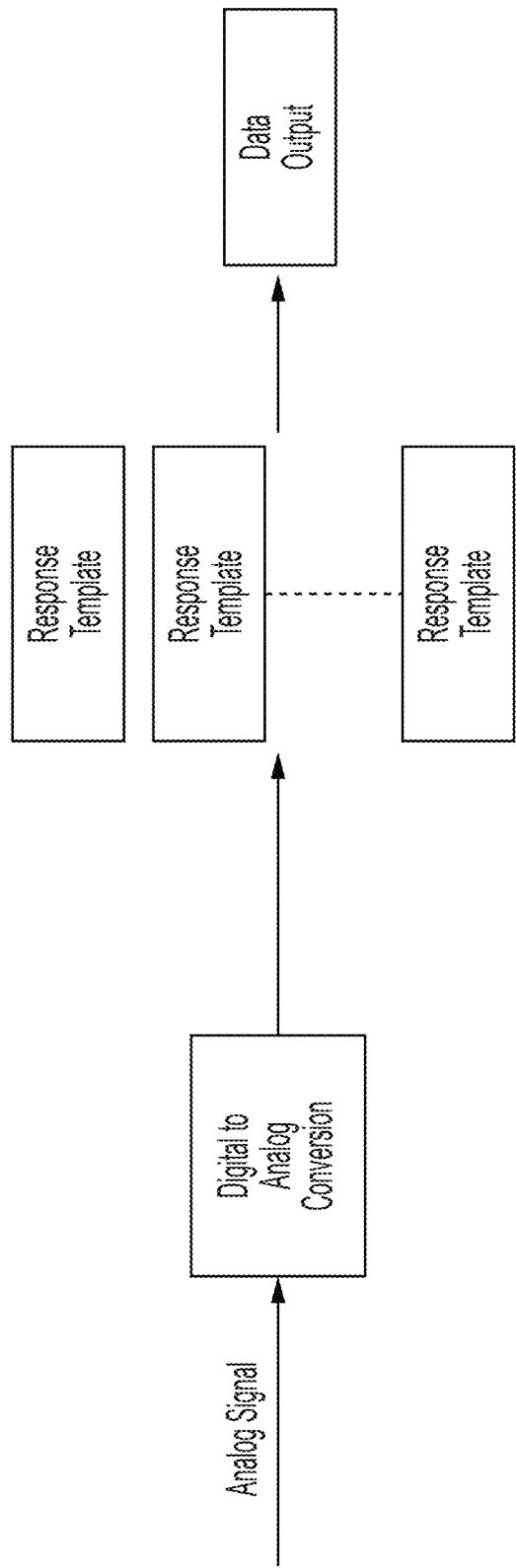
FIG. 7 is a flow chart showing an example process for processing a signal from an optical detection system.

FIG. 7 presents a flow chart showing an example process for processing a signal from an optical detection system. The optical detector may include a photodetector that is configured to generate an analog signal in response to sensing optical signals from a vapor cell sensor. The optical signals may be produced by the vapor cell sensor in response to laser signals and a time-dependent RF signal interacting with a vapor of the vapor cell sensor. In the example process, the analog, time-dependent signal from the photodetector is first digitized. After digitization, the signal is replicated digitally and passed through a series of response templates in parallel. The response templates can be tailored to the response of the vapor for optimum performance. The response template output can determine a symbol in a communications protocol. For example, if an RF pulse has two phase changes, then a response template can be generated from the vapor's response to that pulse in a controlled environment or from a theoretical calculation of the vapor's response. Different search algorithms for the maximum correlation can be used to efficiently determine the Doppler shifts, or other properties, when the computational resources are limited. The RF pulse is encoded with phase and amplitude changes that can be viewed as the symbol in the communications protocol. In some variations, the highest correlated response template to an RF pulse represents the incoming RF signal. The data is then output for further data processing or for display via the user interface. Examples of signal processing using response templates (e.g., matched filters) are described further in U.S. Pat. No. 11,885,904 entitled "Sensing Pulses of Radio Frequency Fields".

In some implementations, and with reference to FIGS. 2A and 2C, the outgoing series of RF pulses 206 may share a pulse period in common. In these implementations, determining the Doppler shift includes generating a sampled portion of response data by sampling the response data over a sampling period that is based on one or more of the pulse periods. Determining the Doppler shift also includes the sampled portion of response data to each of a plurality of response templates to determine respective degrees of fit. Each response template has template data that represents a known response of the vapor to one or more reference RF pulses. Moreover, the one or more reference RF pulses are different for each response template. Determining the Doppler shift additionally includes selecting one of the response templates based on its degree of fit. The sampled portion of response data and the template data of the selected response template are then used to determine the Doppler shift.

In some implementations, the user interface includes a computer-readable code that can be run on a processor and changed by the user to control components of the system, such as the laser system, the optical detector, and the signal processing system. The user interface may be defined by a computer with a display (e.g., a desktop computer, a workstation, a server, a laptop, a tablet, a mobile device, etc.). The user interface may also run diagnostics to monitor the health of the system. In some variations, the laser system, the optical detector, and the signal processing system are configured to interface with the user through the user interface. In some variations, the system is configured for autonomous operation and interfaces with the user through the user interface.

In some implementations, the vapor cell sensor of the system can be a metrology vapor cell, a glass vapor cell, a MEMs vapor cell, or another type of engineered vapor cell based on metamaterial or photonic crystal principles. The vapor cell sensor can be encased in a thin electromagnetically transparent housing, such as one made from PLA plastic. The housing can accommodate a holder for the vapor cell sensor and its waveguide. Several vapor cells addressed by different, detuned lasers are also possible. It is also possible that multiple sets of Rydberg vapor-based sensing beams can pass through a single or multiple vapor cell sensor(s).

In some implementations, the system can be battery powered, plugged into wall power, or both. Battery operation may allow for remote field testing. However, some remote field testing may be compatible with power supplied by a generator, such as a vehicle engine running an alternator to charge a battery and supply DC power. In these cases, the system may be powered by a generator provided on-site at the remote field. In some variations, the system includes a GPS receiver for positioning and a precision clock for timing and data fusion, or both.

Figure 8:
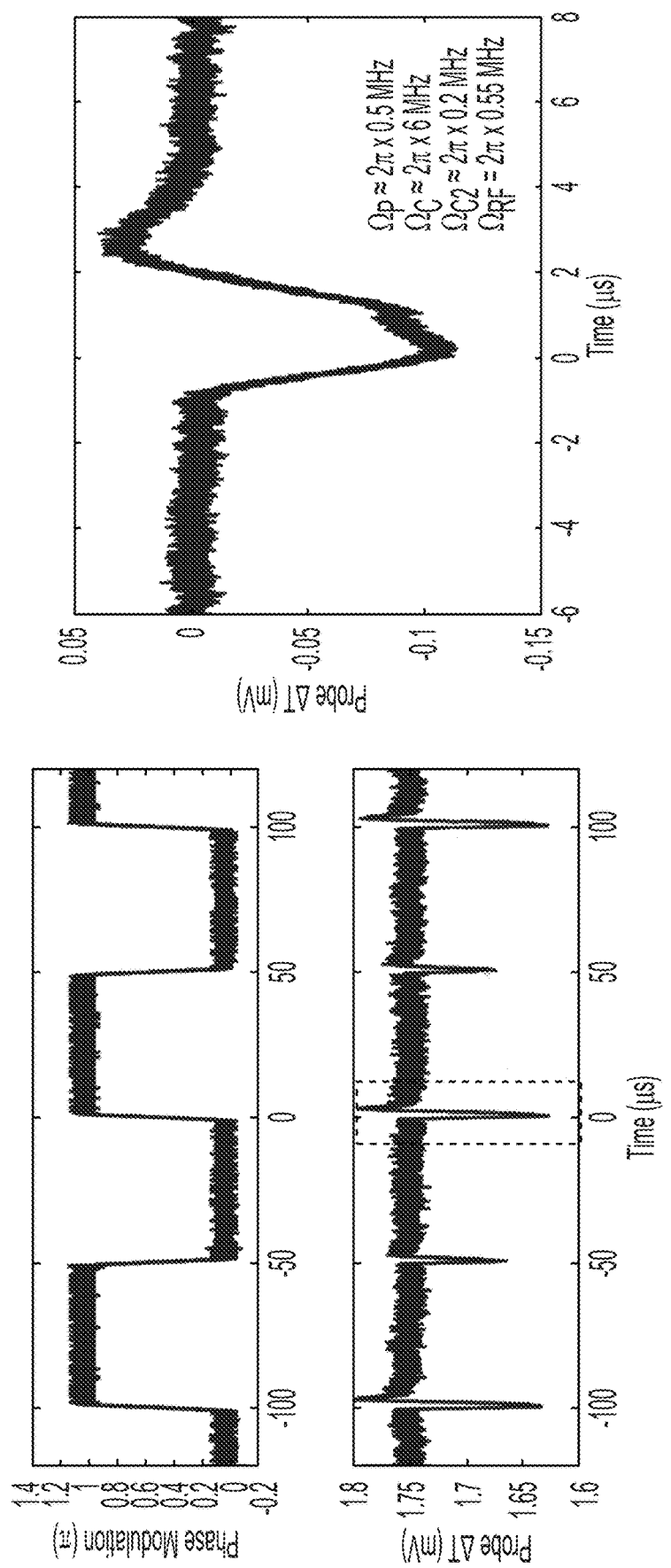
FIG. 8 is a series of graphs showing an experimental series of example RF pulses that each have a pulse period of about 4 µs.

FIG. 8 presents a series of graphs showing an experimental series of example pulses that each have a pulse phase of about 4 µs. The system on which the data was acquired is a three-level Doppler free Rydberg atom-based readout scheme. The example pulses are clearly detected. The asymmetry of the leading and falling edge of the response is also shown in FIG. 8. This asymmetry is due to a detuning of the RF frequency.

In some implementations, the transient response of a Rydberg vapor-based sensor is used to sense RF electromagnetic fields, including phases thereof. In certain cases, the detection of Doppler shifts is addressed to determine the velocity of a radar target. Such techniques may be implemented, for example, by the example systems described above (e.g., the example radar system 200 of FIGS. 2A-2E), or another system can be used. For example, the vapor cell system may be configured with three vapor cell sensors, each with a different set of laser beams (e.g., input optical signals) passing therethrough. Three vapor cell sensors with different detunings, for instance, may allow for better precision for detecting phase shifts. Three vapor cell sensors operated at different frequencies for multi-frequency radar systems can also be advantageous. As another example, the vapor cell system may be configured with three independent beam sets that pass through a single vapor cell sensor.

In some implementations, the phase-modulated RF pulse (e.g., a radar pulse) is transmitted from a transmitter. For example, the transmitter, which can be located at a different spatial location from the system, can transmit a phase-modulated RF pulse having 10 µs duration at a carrier frequency of 10 GHz. The RF pulse can be phase modulated with a period of 2.5 µs and may include 4 phase changes of 90 degrees. The repetition rate of the phase-modulated RF pulse can be selected to be 50 kHz for a 50% duty cycle.

In some implementations, the transmitted RF pulse is scattered from a target (e.g., a moving target). For example, the transmitted RF pulse may scatter from a target travelling at a velocity, v, towards a Rydberg vapor-based sensor (e.g., a vapor cell sensor), configured as an RF receiver. In some implementations, the transmitted RF pulse is received at the Rydberg-based sensor after the transmitted RF pulse is scattered by the target.

In some implementations, a response of the Rydberg vapor-based sensor to the scattered RF pulse is detected. In certain cases, the response of the Rydberg vapor-based sensor may be detected by its influence on the transmission of a probe laser signal through a vapor of a vapor cell sensor. The vapor may alter one or more optical properties of the probe laser signal. The probe laser signal may be detected using a photodetector, which outputs a signal (e.g., an analog signal) representing the one or more altered properties. The signal is digitized by an analog to digital converter (ADC) on the front end of a signal processing system, which may include an FPGA, a processor, and a communications line.

In some implementations, the digital signal is passed through a response template, such as by operation of a signal processing system. For example, the digital signal may be passed through a series of response template. The response templates may be cascaded on an FPGA of the signal processing system to determine the response difference between a +90-degree phase change and a −90-degree phase change. The most highly correlated response can then be selected to yield the Doppler shift, kv (where k is the wavevector of the RF field and hence velocity of the target), as well as to yield the timing of the scattered RF pulse to determine a distance of the target. This data (e.g., target velocity and detection time) may be transferred to a second processor of the signal processing system.

In some implementations, the data are transmitted from the signal processing system to a data processing system. The data processing system may generate information about the target from the data. For example, the target velocity and detection time may be sent to a data processing system that includes a user interface. In some variations, the target velocity and detection time may also include a time stamp generated from a clock and the spatial position of the Rydberg vapor-based sensor. This information is displayed for the user interface and may be available for local processing as well as entry into a data logging system.

In some implementations, the information about the target from the data processing system is transmitted to a communications system. The communication system may, in turn, forward the information to a data fusion center, especially if the Rydberg-based sensor is part of a multi-static radar system. In this case, the Rydberg vapor-based sensor may serve as an RF receiver of the multi-static radar system. Multiple such receivers are possible for the multi-static radar system. For this system, the target information from the collection of receivers and transmitters forming the system can be processed at the data fusion center and returned to the receiver site. It may be possible to use the fused data to further filter the received data at each receiver site. The exchange of data between the receiver site and the data fusion center does not have to occur on a pulse-by-pulse basis but could take place after larger numbers of pulses have been acquired and processed. Example configurations of radar systems, including multi-static radar systems, are described in U.S. Pat. No. 11,137,487 entitled "Radar Systems Using Photonic Crystal Receivers to Detect Target Objects".

In many implementations, the operations described above are repeated, in whole or in part, over time as scattered RF pulses from different targets are received. Such techniques may be used for many types of radar systems, including multi-static or bistatic radar systems.

In some implementations, the systems and methods described herein may be configured to use pulse compression in conjunction with Rydberg vapor-based sensing. Pulse compression can provide a notable advantage in radar applications because it allows increased range resolution and detectability. Pulse compression also allows a long RF pulse optimized for the detection of small return signals to be implemented simultaneously with a broad spectral bandwidth pulse, narrow in time, that is optimized for range resolution. If the radar return signals of two or more targets lie within the temporal width of the overall radar pulse, the pulse compression enables the identification of the targets within the overall pulse without reducing the overall energy of the radar signal.

The transient response of a Rydberg vapor-based sensor may be used to implement pulse compression. As noted above, Rydberg vapor-based sensors are traditionally understood to be square law detectors, which means that the phase of an RF field cannot be readily detected without additional sensing techniques. Such techniques may include the use of an RF local oscillator with the Rydberg vapor-based sensors or the construction of an interferometer based on the internal electronic structure of an atom or molecule. However, both techniques have proven to have slow readout compared to expected radar pulse repetition rates. The belief that Rydberg vapor-based sensors are square law detectors only holds true if sensing is limited to the steady state behavior of the atomic or molecular response. In contrast, transient behavior can be used to sense phase changes through the conversion of phase to amplitude response. The phase to amplitude conversion occurs because EIT and EIA can both be coherent processes that depend on the phase of the driving RF fields, one of which is the target RF field being sensed. Under EIT or EIA conditions, a phase change of the target RF field causes a change in the probe laser transition polarization of the atomic or molecular sample. The change in RF phase induces a change in the probe laser transmission. The transient response, which can induce both additional absorption and transmission phenomena, is due to the vapor equilibrating through optical pumping. Under conditions where the absorption line is Lorentzian, like in a three-photon readout scheme, detuning can be used to introduce a fixed phase output, thereby allowing full $2\pi$ phase detection. For readout and preparation schemes where the vapor response is Doppler limited, the phase is averaged more, reducing this capability. However, the phase change detection is nevertheless preserved in the Doppler limited cases.

However, a phase-modulated RF signal can be implemented in Rydberg vapor-based sensors in order to realize pulse compression. A laser configuration where the lasers are on resonance with the Rydberg atom or Rydberg molecule will exhibit a phase to amplitude response as the phase of an incoming RF pulse is modulated with a period that is shorter than its overall pulse length. Changes of phase within the longer pulse can be correlated with a delayed copy of the transmitted signal as processed by the Rydberg vapor-based sensor, which serves as a receiver. The cross-correlation leads to a better time-resolved pulse. If there are several different return pulses that overlap but are shifted from one another (e.g., less than the pulse length), the cross-correlation can separate the time of arrival. In other words, the transient phase pulses from each signal will be interlaced but can be identified since the sub-pulse length is known. In some variations, the transient signal can also be used to invert the modulated segment (when present) in order to transform the incoming RF pulse into a digitally phase modulated signal. In this case, the transient phase signal acts as a marker to label the sign of the associated sub-pulse.

Both pulse compression variants are compatible with systems for Doppler shift detection. For example, a system configured for pulse compression detection can include one or more vapor cell sensors (e.g., a metrology vapor cell or a photonic crystal receiver) that are connected to a laser system and signal processing system and at least one transmitter. Multiple receivers and transmitters are possible, which may allow for the realization of a multi-static radar system. In some variations, the vapor cell sensors may have a focusing element to make them more sensitive to incoming RF signals. The signal processing system acquires a time-dependent signal (e.g., a time-dependent analog signal) via the principles of Rydberg vapor-based RF electric field sensing. The RF electric fields may, for example, have frequencies between 1 MHz-300 GHz. The analog signal may be digitized and stored in a digital format. The digitized signal may be run through a matched filter (or series thereof) corresponding to the expected radar pulses to obtain both amplitude and transient phase information, in order to implement pulse compression for timing. Ideally, the matched filters/compressed pulse waveforms are tailored to the response of the vapor (e.g., atomic response, molecular response, etc.). The phase information is carried in the transient response while the amplitude is associated with the steady-state signal. The filters can be run using, for example, field programmable gate arrays (FPGAs) or graphics processing units (GPUs).

Pulse compression can provide significant advantages for radar applications. With pulse compression, a long pulse of relatively high energy can be used to aid in the detection of weak radar return signals. This detection can occur while the modulation of the pulse over shorter time intervals is utilized to increase range resolution, thereby allowing the detection of targets with smaller spatial separations than would otherwise be possible with the long pulse alone.

EIT/EIA-like processes can be coherent processes, e.g., they depend on the relative phases of the driven off-diagonal elements of the density matrix describing the process. The density matrix elements may be complex valued. When the constituents of a Rydberg vapor experience a phase change, they must equilibrate to reach the steady state, such as by adapting to the phase change. Consequently, the transient response is sensitive to changes in phase of any of the fields interacting with the atom. Because the laser fields are narrow bandwidth and stabilized to a reference, their phase is relatively stable, particularly in the case of a colinear Doppler-free three-photon readout and preparation scheme where the EIT/EIA signal is Lorentzian. The RF phase is also generally stable as demonstrated by its narrow spectral bandwidth. If the RF electromagnetic wave changes its phase abruptly due to a phase encoding in the incoming wave, it induces a transient response that can be used to determine the phase change, as shown in FIG. 1. In some variations, the transients are fast on the scale of a pulse width (e.g., on the order of microseconds). Moreover, the signal may be strong. As such, sensing using transient responses can allow for the fast readout of phase changes, often in timescales less than 1 μs. Such fast readout can allow real-time decoding of an incoming RF signal using digital signal processing after the analog photodetector output has been digitized.

Figure 9:
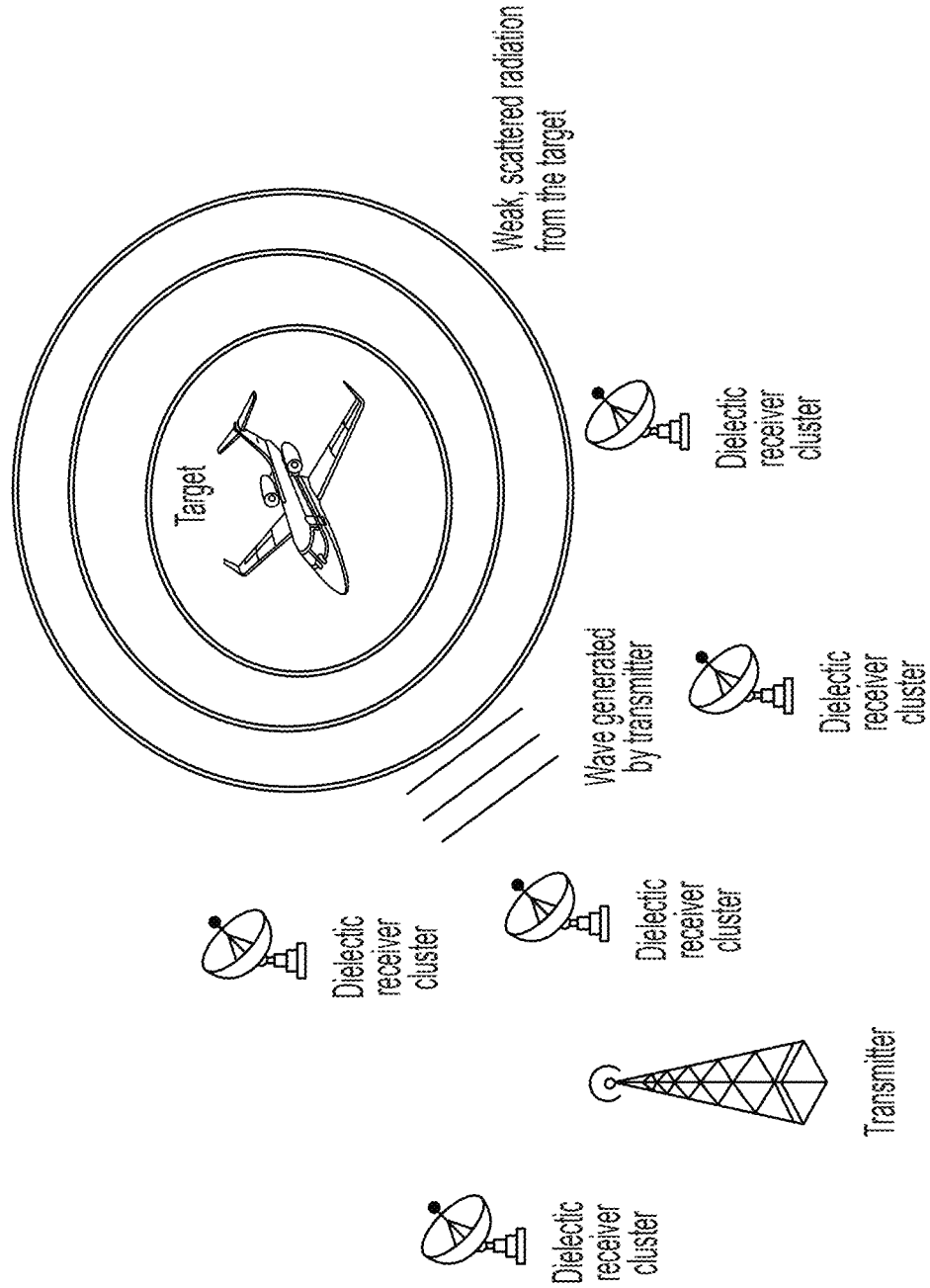
FIG. 9 is a schematic diagram of an example of a Rydberg receiver radar system.

FIG. 9 presents a schematic diagram of an example radar system that includes one or more Rydberg vapor-based sensor systems that serve as respective receivers of the example radar system. The one or more Rydberg vapor-based sensor systems may be analogous to the example system 200 described in relation to FIG. 2. Moreover, the Rydberg vapor-based sensing systems may each include one or more vapor cell sensors that are formed, in whole or in part, of dielectric materials. In these cases, the Rydberg vapor-based sensor systems may serve as respective dielectric receiver clusters of the example radar system.

In the example radar system, at least one receiver and one transmitter can be utilized to form a bistatic Rydberg vapor-based receiver radar system. The system can be extended to form a multi-static radar system by adding more transmitters and receivers. In some variations, the signal processing is done with analog electronics. However, in other variations, the signal processing is done with digital electronics. In this case, the digital electronics may include an analog-to-digital converter for converting analog signals to digital signals. There may be significant advantages to converting the analog signal to a digital signal for processing, especially when using massively parallel circuitry in the receiver. The phase modulated pulse is readout at baseband by the signal processing system. Once it is digitized, it can be correlated with the phase-modulated signal as changed by the vapor's response. The expected signal is not the signal transmitted by the transmitter, but rather, the signal transmitted by the transmitter as received and processed by the vapor (e.g., processed by one or both of the Rydberg atoms and the Rydberg molecules). Examples of radar signal processing using Rydberg vapor-based receivers are described further in U.S. Pat. No. 11,885,904 entitled "Sensing Pulses of Radio Frequency Fields".

Figure 10:
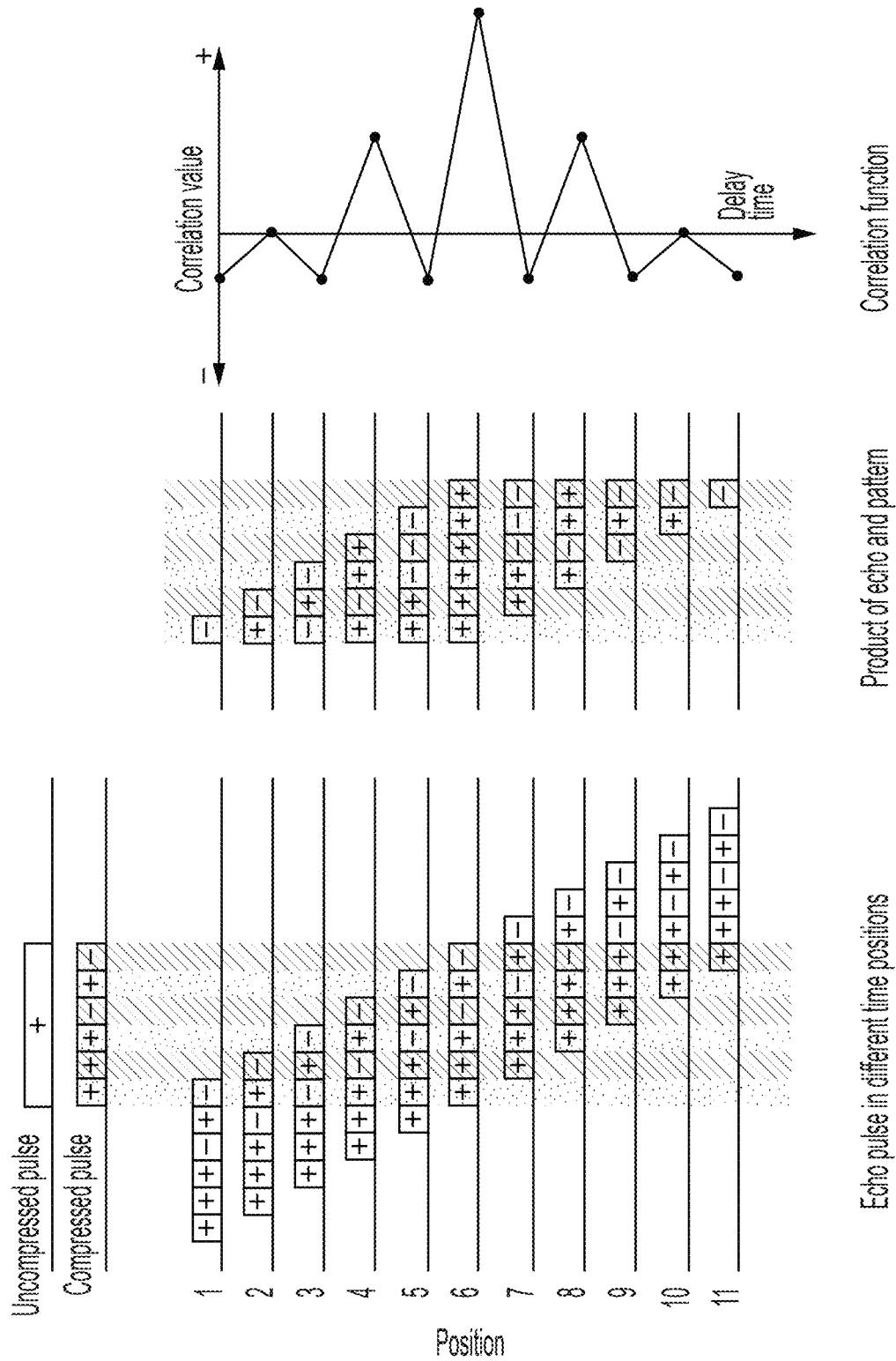
FIG. 10 a schematic diagram that shows an example of pulse compression using a Rydberg vapor-based sensor.

FIG. 10 presents a schematic diagram that shows an example of pulse compression using a Rydberg vapor-based sensor. The Rydberg vapor-based sensor may be analogous to the vapor cell sensor 224 of FIG. 2C. The Rydberg vapor-based sensor may be configured as a receiver of a radar system (e.g., receiver system 204 of example radar system 200), and an uncompressed pulse is illustrated in the upper left corner of FIG. 10. The uncompressed pulse may have the bandwidth that is the inverse of its pulse length in time. Its range resolution is the speed of light divided by the bandwidth. A compressed pulse that is correlated with an expected template (e.g., a matched filter) can have much better range resolution because the bandwidth is that of a sub-pulse. FIG. 10 shows how the correlation process works to narrow the return signal in time. The radar system may use compressed pulses that are based on 100s to 1000s of sub-pulses.

In FIG. 10, a pulse that is relatively long in the time domain, e.g., about 100 μs, is phase modulated so that N sub-pulses of width $\tau_s$ span it. The phase modulation extends over the entire pulse. Bi-phase modulation may be used but is not required. Each sub-pulse may also have the same width, but a common width is also not required. To increase the range resolution that can be obtained from the pulse, a correlation with an expected pulse template (e.g., a response template) is performed. The correlation can be performed with analog electronics, but there are advantages to performing the correlation digitally, such as being able to run multiple response templates and the reduction in noise that arises from digital signal processing. The correlation signal S(t) can be obtained mathematically, as shown by Equation (1) below:

$$S(t) = \int_{-\infty}^{+\infty} x(t)h(t+\tau)d\tau \quad (1)$$

Here, x(t) is the incoming phase-processed signal (most likely digitized), and h(t) is the template. The template and digitized signal are integrated over a time delay, as shown in FIG. 10. In conventional radar applications, x(t) is the raw incoming signal. In the present case, e.g., for Rydberg vapor-based receivers, where we use transient phase changes encoded in the received amplitude, x(t) is a signal processed incoming signal, where processing includes how the Rydberg vapor responds to the incoming RF pulse.

In some implementations, e.g., for the case of a binary phase modulation, transient phase changes for one phase are chosen as a '+' and the other a '−'. The transient phase is used to assign a '+' or '−' to each sub-pulse. Once the assignment has been completed, the correlation with the expected phase-modulated signal can be performed. Note that the sub-pulse temporal width is known. Once the assignment step to '+' and '−' is performed, perhaps using one or more response templates, the pulse is compressed using digital pulse compression, which can use standard compression algorithms.

A number of different coding schemes can be used such as Barker codes, pseudo random codes, and other classes of sidelobe cancelling codes. The use of Barker codes is described in relation to FIGS. 11A-12C. However, in many implementations, the transient phase is used to indicate the overall phase of each sub-pulse. For Rydberg vapor-based receivers, the approach is particularly advantageous because phase detection can, in certain cases, be difficult and generally slow, making it very challenging to implement pulse compression. However, in some cases, the approaches described here can avoid such challenges and can be done all-optically.

Pulse compression is useful for radar applications because, when used with Rydberg vapor-based receivers, it allows both high energy pulses (long pulses in time) and high bandwidth to be achieved in the same system. Phase modulation can be used for pulse compression. Pulse compression can be achieved by changing the phase within the longer pulse so that the long pulse includes, or is defined by, a number of sub-pulses. Moreover, pulse compression can be achieved by using transient phase change detection. If the temporal length of the overall radar pulse is $\tau_E$ and each sub-pulse has a temporal length of $\tau_C$, then the compression ratio is defined to be CR=$\tau_E/\tau_C$. The compression ratio in real radar pulses can be on the order of 1000. In the case of N temporally equal length sub-pulses, the bandwidth of the compressed pulse B=1/$\tau_C$. Without pulse compression the range resolution ΔR=c $\tau_E$/2 would be about 15,000 m for a 100 μs pulse, where c is the speed of light. If 100-ns sub-pulses are used for pulse compression, the same 100 μs radar pulse could have a range resolution of ΔR=c τc/2=c/2B~15 m.

Pulse compression may be used with the example radar system 200 of FIGS. 2A-2E. For example, each of the outgoing series of RF pulses 206 may be divided into a sequence of sub-pulses that have respective phases. The respective phases defined by the reference phase modulation according to a pulse compression protocol, such as a Barker encoding scheme, a pseudo random encoding scheme, a sidelobe cancelling code, and so forth. In these cases, the velocity of the object 210 may be determined based on the Doppler shift and respective arrival times of one or more target RF pulses in the incoming series of RF pulses 212. To do so, the signal processing system 222 may generate, based on the transient response data over time, correlation values for a target RF pulse in the incoming series of RF pulses 212.

Examples of such values are shown in the rightmost graph of FIG. 10. The target RF pulse is divided into a sequence of target sub-pulses that have respective target phases, and the correlation values represent a correlation of the target sub-pulses, in time, with one or more reference sub-pulses of a reference RF pulse. The one or more reference sub-pulses have respective reference phases that are defined by the reference phase modulation according to the pulse compression protocol. The signal processing system 222 may then determine an arrival time of the target RF pulse based on the correlation values. In some instances, such as shown in FIG. 10, the one or more reference sub-pulses are associated with respective symbols of the pulse compression protocol. In these instances, the signal processing system 222 may assign, based on the transient response data, respective symbols to the target sub-pulses of the target RF pulse. The respective symbols are part of the pulse compression protocol. In FIG. 10, the symbols correspond to '+' and '−'. However, other symbols are possible.

In some implementations, the signal processing system 222 may instruct the vapor cell system 214 to switch the vapor 216 between conditions of EIT and EIT, such as by sending control signals to the laser system 226 to detune one or more the laser signals 220. This switching may allow the example radar system 200 to directly determine symbols of the incoming series of RF pulses 212 (e.g., '+' and '−' symbols) without having to use transient modulation. However, in certain cases, the switching process may be used in combination with transient modulation. Switching between conditions of EIT and EIT is described further in relation to FIGS. 11A-11C.

Rydberg vapor-based sensors can be square law detectors in the steady state. In other words, they can be insensitive to phase when operating in a steady-state condition. However, their transient behavior is not insensitive to phase. A change of phase in an RF electromagnetic field incident on a Rydberg vapor-based sensor can lead to a change in the interference phenomena used to dress a Rydberg atom or molecule. In this case, the Rydberg vapor is sensitive to the RF target signal as well as the readout of the RF target signal. When the phase of the incident RF field changes, the transmission (or analogously the absorption) of the probe laser beam will exhibit large changes, as shown in the graphs of FIGS. 1 and 4. These changes can be of the same size as an amplitude-modulated RF field. The magnitude of the signal depends on the strength of the RF electromagnetic field and its phase change. The phase change can be used for encoding signals for pulse compression. The fact that phase can be detected in this way allows for an all-optical method for detecting phase. Moreover, such methods do not require an RF local oscillator. The laser configuration can also be the same as that used for Rydberg vapor-based sensors under standard EIT/EIA conditions. Additional lasers are not necessary and phase stabilization of the lasers beyond what is required for standard Rydberg vapor-based sensors is not necessary. Furthermore, the three-photon readout method described previously may be used for pulse compression. The three-photon readout method can offer an advantage when detecting phases and can extend to pulse compression. The signal (e.g., the optical signal) in the three-photon readout does not suffer from Doppler averaging, which can result from the motion of atoms or molecules in the vapor of a vapor cell sensor. This motion can suppress some of the phase effects by averaging them into a single representative value.

Now referring back to FIG. 9, an example radar system may include a Rydberg vapor-based sensing system and a transmitter. The Rydberg vapor-based sensing system may be analogous to the receiver system 204 described in relation to FIGS. 2A and 2C. The transmitter is configured to transmit a pulse that is phase modulated in time with N sub-pulses that span the entire radar pulse. Although FIG. 9 depicts the example radar system as having five Rydberg vapor-based sensing systems and one transmitter, other numbers are possible for the Rydberg vapor-based sensing system and the transmitter (e.g., one Rydberg vapor-based sensing system and one transmitter). For example, the numbers of Rydberg vapor-based sensing systems and transmitters—including the distances therebetween—may be selected to configure the example radar system to be a bistatic radar system or a multi-static radar system.

In many implementations, each Rydberg vapor-based sensing system is configured to read out a time-dependent RF signal. During operation, a transmitter of the example radar system may transmit a radar signal with a predefined compressive modulation. In response, the Rydberg vapor-based sensing system—and particularly, its optical detector—may generate an analog signal representing properties of the radar signal (e.g., changes in phase). In some variations, the analog signal is converted to a digital signal by a signal processing system of the Rydberg vapor-based sensing system. The digital signal may then be processed by the signal processing signal (and possibly also a data processing system of the Rydberg vapor-based sensing system) to determine the correlation between the incoming signal and one or more response templates. The best matching response template may then be selected as representative of the incoming signal (or portion thereof).

During operation of the example radar system, the presence of transient phase pulses spaced at less than the sub-pulse spacing may indicate that several targets exist within the overall radar return pulse. The signal processed by the vapor and resulting from the phase-modulated compressed pulse can be determined by density matrix calculations or test signals. Such determination allows the Rydberg vapor-based sensing system to obtain a pulse shape, as modified by the atomic or molecular response of the vapor. In some variations, an initial template can be used to label each sub-pulse and turn it into a digitally modulated waveform. The correlation in this case is carried out between a digital compressed response template and the digitally processed signal. In some variations, phase modulation of the radar signal is conducted using N pulses where the phase is switched back and forth with a single period over the extent of each radar pulse. For a several-hundred microsecond radar pulse, the sub-pulses might range from 5 μs to 100 ns. Different phase changes are possible such as 0 and 180-degrees or 0 and 90-degrees. Different response templates may also be used, particularly for digital signal processing, such as to increase the signal-to-noise ratio. The increased ratio may allow the Rydberg vapor-based sensing system to better determine, or sense, the phase changes since the pulse shapes may be different for different incoming RF pulse amplitudes (e.g., see FIG. 7). In some variations, pulse compression by the Rydberg vapor-based sensing system may be achieved using analog processing of the signal from the optical detection system.

Different phase-modulated sequences can be employed by the example radar system. A wide range of encoding schemes like Barker codes, pseudo-random codes, or side-lobe cancelling codes can be implemented. Moreover, the phase modulation from the phase-to-amplitude conversion can be used to indicate phase changes so that the correlation between a response template and the incoming signal can be performed. These sequences can be static or changed deterministically in time or can be detected using an array of templates, as shown by FIG. 7. In these cases, the transmitter may emit several different phase-modulated pulses to decrease the ability to jam or interfere with the signals.

The flowchart of FIG. 7 may represent a part or all of a pulse compression process. The flowchart starts where a time-dependent analog signal—such as from a photodetector of an optical detector—is first digitized. After digitization, the signal is replicated digitally and correlated with a response template, which may be pulse filter. The data output from the response templates can be used to determine the target range at higher resolution using a higher energy pulse. The higher energy pulse increases the detectability of a target and can separate multiple targets within the overall pulse. One or several templates can be used. Multiple response templates have the advantage of being tailored to the amplitude of the incoming RF pulse as processed by the Rydberg atoms or molecules in the vapor.

To conduct the process shown by FIG. 7, the signal processing system of the Rydberg vapor-based sensing system may include a digital processor, such as an FPGA or GPU. The digital processor may allow multiple correlations of the incoming signal to be run with different templates. The templates can be generated using calculations such as those based on density matrix equations or by using experimentally generated templates. The templates can be tailored to the response of the vapor, although other pulse shapes are possible. For long pulses, the response may be less important, and a square or rectangular pulse template can be used. Once the signal from the photodetector is digitized, a cross-correlation is run with the expected pulse template. For example, the template and the incoming RF pulse can be multiplied as they are scanned in time relative to one another. As another example, the pulses may be multiplied by one another to obtain the correlation after each sub-pulse, where the phase has been flipped, has been multiplied by a −1. In other words, the transient phase changes are used to indicate whether the sub-pulse is '−' or '+'. The response template, likewise, can have the same format so that correlated sections sum over the integration time and anti-correlated sub-pulses give zero signal, such as shown in FIG. 10. In this way, the response is maximized when the response template and the signal overlap perfectly in time. At earlier and later times, the correlation signal may be non-zero but generally is designed to be much less than when the response template and signal are in conjunction. The maximum of the correlation signal is used to determine the range of the target(s).

In some implementations, signals from a Rydberg vapor-based receiver are processed in a radar system. Pulse compression for the Rydberg vapor-based receiver can be addressed, for example, when processing RF pulses of a radar signal. A radar system, such as the example radar system 200 described in relation to FIGS. 2A-2E and the example radar system described in relation to FIG. 9, may be used to implement such techniques in some instances. In some implementations, the radar system includes a Rydberg vapor-based sensor system that serves as the Rydberg vapor-based receiver of the radar system. The Rydberg vapor-based sensor system may, in certain cases, be analogous to the receiver system 204 described in relation to FIGS. 2A and 2C. The radar system also includes a transmitter capable of phase modulation, such as for generating phase-modulated RF pulses that correspond to response templates. One or more templates of the phase-modulated RF pulses and the necessary response templates can be used to detect the phase changes carried on the sub-pulses of the overall RF pulse.

In some implementations, a phase-modulated RF pulse (e.g., a radar pulse) is transmitted from a transmitter. For example, the transmitter, perhaps located at a different spatial location from the system, can transmit a phase-modulated RF pulse of greater than 100 µs duration at a frequency of 10 GHz. The RF pulse can be phase modulated with a period of 200 ns and may include phase changes of 0 and 90-degrees. The repetition rate of the phase-modulated RF pulse can be selected to be 2 kHz. The modulation sequence across the phase-modulated RF pulse is predetermined.

In some implementations, the transmitted RF pulse is scattered from a target (e.g., a moving target). For example, the transmitted RF pulse may scatter from a target travelling at a velocity, v, towards a Rydberg vapor-based receiver. In some implementations, the transmitted RF pulse is received at the Rydberg-based receiver after the transmitted RF pulse is scattered by the target.

In some implementations, a response of the Rydberg vapor-based sensor to the scattered RF pulse is detected. For example, the response of the Rydberg vapor-based sensor may be detected by its influence on the transmission of a probe laser signal through a vapor of the Rydberg vapor-based receiver. The vapor may alter one or more optical properties of the probe laser signal. The probe laser signal may be detected using a photodetector, which outputs a signal (e.g., an analog signal) representing the one or more altered properties. The signal is digitized by an analog to digital converter (ADC) on the front end of a signal processing system, which may include an FPGA, a processor, and a communications line. A precision clock of the radar system is used to determine the timing and can be in communication with the transmitter and other Rydberg vapor-based receivers.

In some implementations, the digital signal is passed through a response template, such as by operation of a signal processing system. In some variations, the digital signal is passed through a series of response templates. The response templates may correspond to respective pulse templates whose characteristics (e.g., shape, duration, etc.) have been predetermined. The response templates may be used by the signal processing system to assign a '+' to a 90-degree phase change and a '−' to a 0-degree phase change. The initial sub-pulse is known to be either a '+' or '−' based on the predetermined response template.

In some implementations, an arrival time of the scattered RF pulse at the RF-based receiver is detected by obtaining an integrated pulse amplitude. The integrated pulse amplitude can be based on a response template or integrator and may be calculated by operation of the signal processing system.

In some implementations, an arrival time of the scattered RF pulse is determined by correlating processed sequences of '+' or '−' to respective response templates. The processed sequences of '+' or '−' are weighted by the amplitudes of their sub-pulses, and the response templates are weighted by their integrated pulse amplitudes.

In some implementations, data is transmitted from the signal processing system to a data processing system. The data may include information about the arrival time of a scattered RF pulse. The data processing system may generate information about the target from the data, such as the velocity of the target and its location. For example, the arrival time of the RF pulse may be sent to a data processing system that includes a user interface. In some variations, the arrival time may also include a time stamp generated from a clock and the spatial position of the Rydberg vapor-based receiver. This information is displayed for the user interface and may be available for local processing as well as entry into a data logging system.

In some implementations, the information about the target is transmitted from the data processing system to a communications system. The communication system may, in turn, forward the information to a data fusion center, especially if the Rydberg vapor-based receiver is part of a multi-static radar system. For a multi-static radar system, the target information from the collection of receivers and transmitters can be processed at the data fusion center and returned to the receiver site. It may be possible to use the fused data to further filter the received data at each receiver site. The exchange of data between the receiver site and the data fusion center does not have to occur on a pulse-by-pulse basis but could take place after larger numbers of pulses have been acquired and processed. Example configurations of radar systems, including multi-static radar systems, are described in U.S. Pat. No. 11,137,487 entitled "Radar Systems Using Photonic Crystal Receivers to Detect Target Objects".

In many implementations, one or more operations of the techniques described above are repeated, in whole or in part, over time as scattered RF pulses from different targets are received. Such techniques may be used for many types of radar systems, including multi-static or bistatic radar systems.

The output of a response template to a pulse sequence may include a dominant peak and possibly several sidelobes. The response of the Rydberg vapor-based receiver to a single square pulse has a main peak that is temporally broad, which can limit the ability to distinguish targets in radar that are located nearby in space (e.g., limit range resolution), especially when one target is weaker. A temporally broad main peak may also increase the uncertainty in the time of arrival of weak signals. Pulse compression techniques can be used to reduce the main lobe's temporal width, while minimizing the height of sidelobes. To achieve these effects, a signal can be generated whose receiver response contains components that are above (+) and below (−) the baseline signal level in a certain sequence. In some examples, both signs of the signal in a Rydberg vapor-based receiver can be generated to produce "bi-phase" Barker codes. In some cases, other pulse compression sequences can be used, including polyphase codes.

Figure 11A:
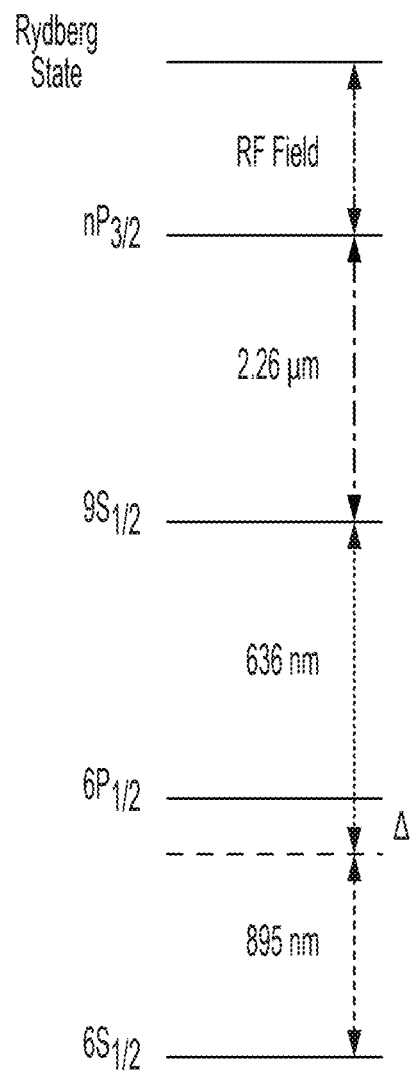
FIG. 11A is a schematic diagram of an example excitation scheme that is based on a vapor of cesium atoms.

To generate both signs of an RF response, a Rydberg vapor system that has greater than two optical excitation photons can be moved between electromagnetically induced absorption (EIA) and transmission (EIT). In some implementations, the Rydberg system is based on a three-photon optical excitation scheme. For example, the Rydberg system may be based on the electronic states of the Cs atom, such as shown in FIG. 11A. In this case, the vapor in the Rydberg vapor-based receiver includes a vapor of Cs atoms, which serves as a vapor of Rydberg atoms. However, this technique can be implemented with other alkali atoms (e.g., Rb) and with other excitation schemes (e.g. a four-photon optical excitation scheme).

Figure 11B:
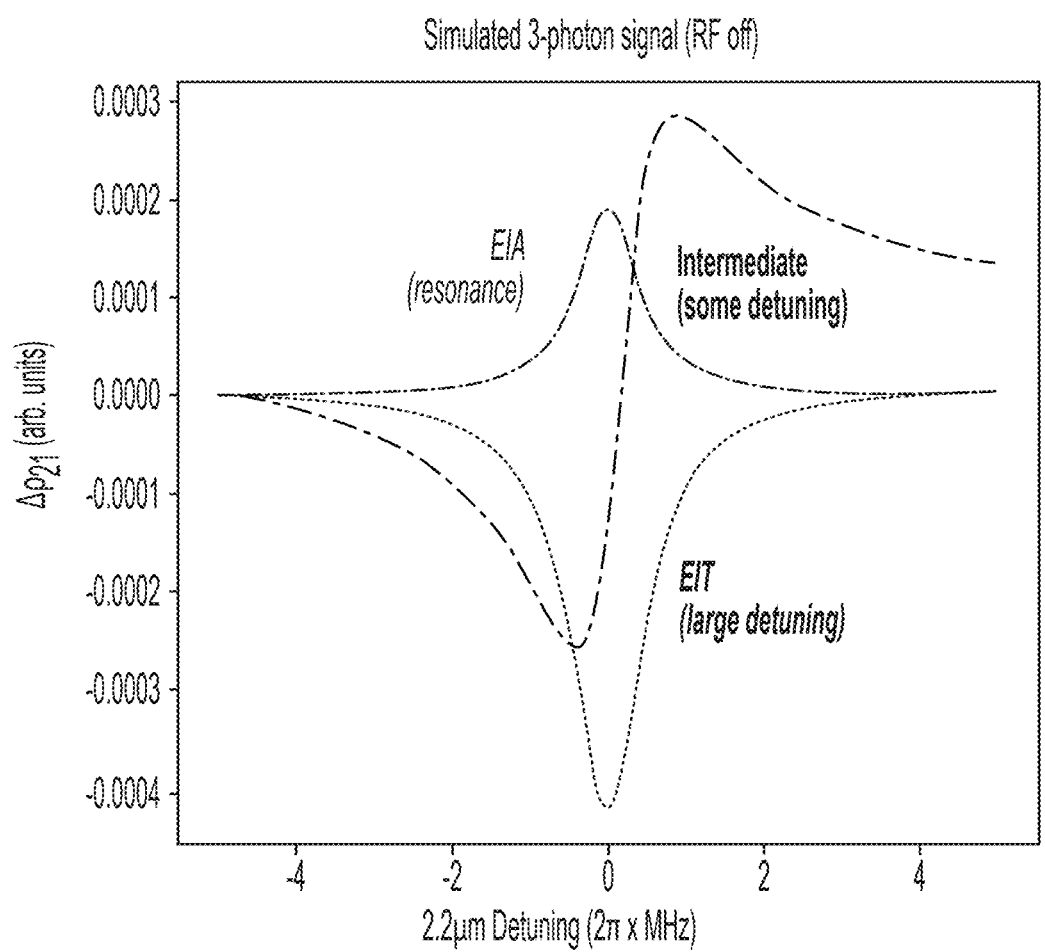
FIG. 11B is a graph showing a simulated example of how the detuning of at least two lasers can be adjusted to place a Rydberg system between electromagnetically induced transparency (EIT) and electromagnetically induced absorption (EIA)
Figure 11C:
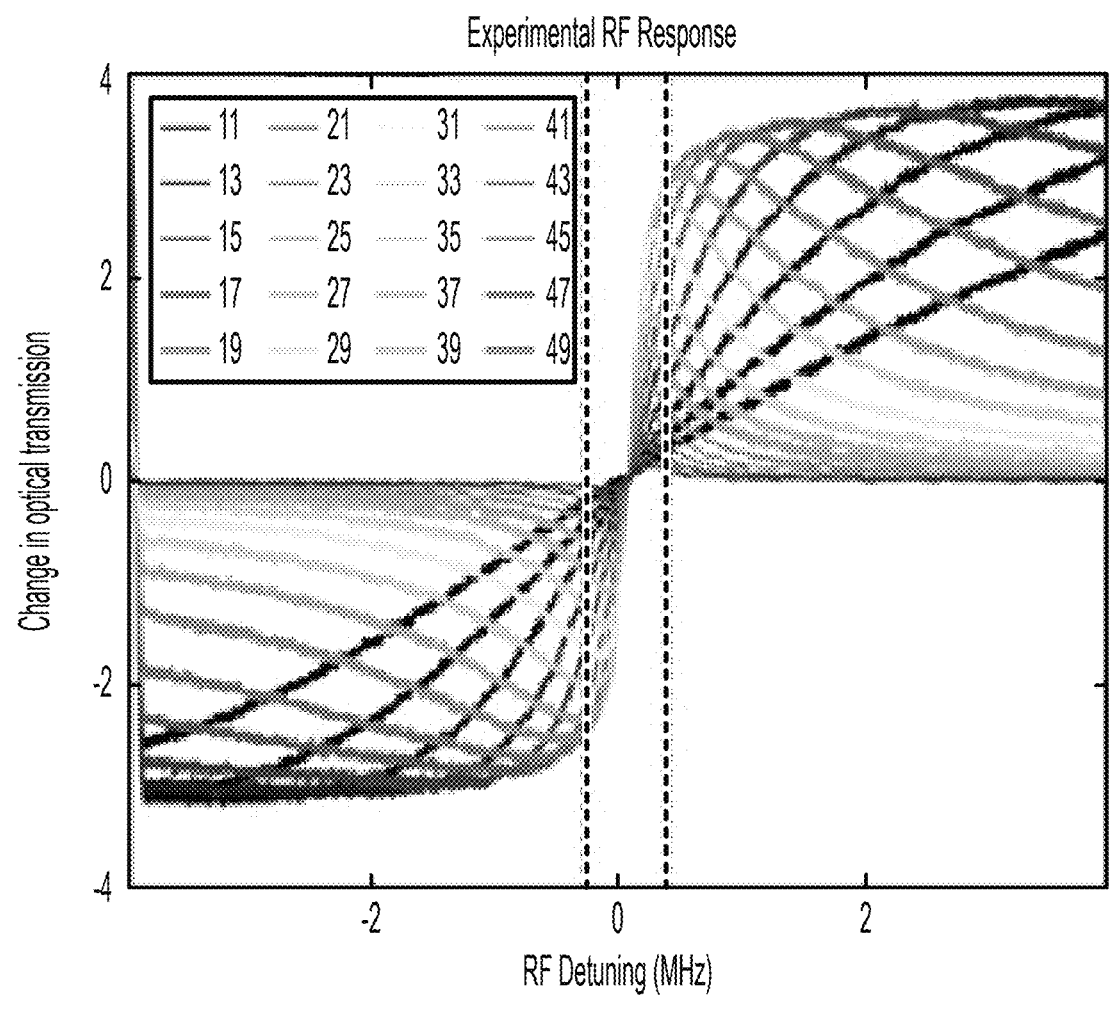
FIG. 11C is a graph showing an example of how the frequency of an RF field can be varied to produce a positive or negative change in optical transmission through a vapor of cesium atoms.

In the three-photon scheme, and using a vapor of cesium atoms, the Rydberg system can be moved between EIA and EIT by detuning the 636-nm and 895-nm laser signals in nominally equal, but opposite directions. In many cases, the directions are near equal but should be adjusted to obtain optimal signal height and asymmetry. As the amount of detuning increases and the first excited level (e.g., $\delta P_{1/2}$ in FIG. 11A) becomes adiabatically eliminated, the Rydberg vapor system switches from complete EIA to complete EIT. The amount of detuning can be chosen in between these two regimes to produce a line shape that is asymmetric about atomic resonance. For example, FIG. 11B presents a graph showing a simulated example of how the detuning of at least two lasers can be adjusted to place the Rydberg system between EIT and EIA. Here, the 2.26-μm laser signal is detuned while no RF field is interacting with the vapor of cesium atoms (e.g., the RF field is "off"). FIG. 11C presents a graph showing an example of how the frequency of an RF field can be varied to produce a positive or negative change in optical transmission through the vapor of cesium atoms. As the RF field is being detuned, the shape and magnitude of the EIT response and the EIA response change. The amount of laser detuning required in FIGS. 11B and 11C is around $2\pi \times 5$ MHz, but this value can also depend on the Rabi frequencies of the laser signals. A "biphase" Barker code can be generated by using two RF frequencies detuned equally but in opposite directions from resonance (see dashed lines in FIG. 11C).

Figure 12A:
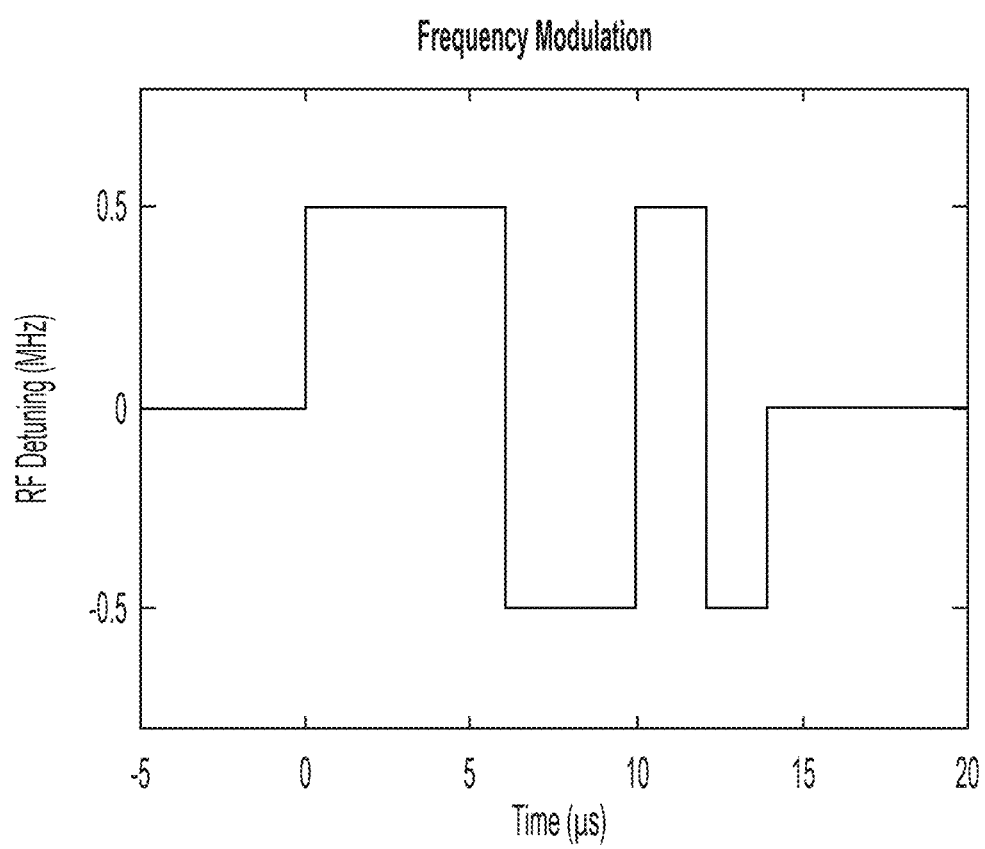
FIG. 12A is a graph showing a graph of an example Barker encoding process in which frequency modulation is applied to an RF field to generate a coded RF pulse.
Figure 12B:
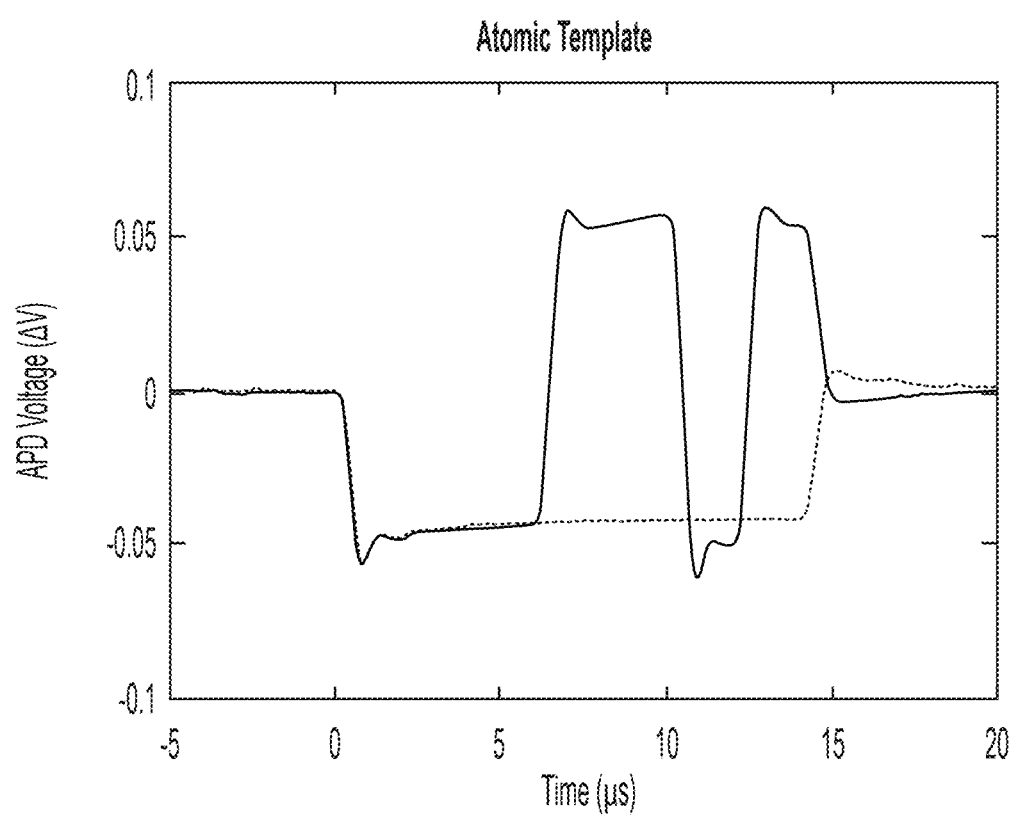
FIG. 12B is a graph of an example vapor response to the coded RF field of FIG. 12A, averaged to make a matched filter template.
Figure 12C:
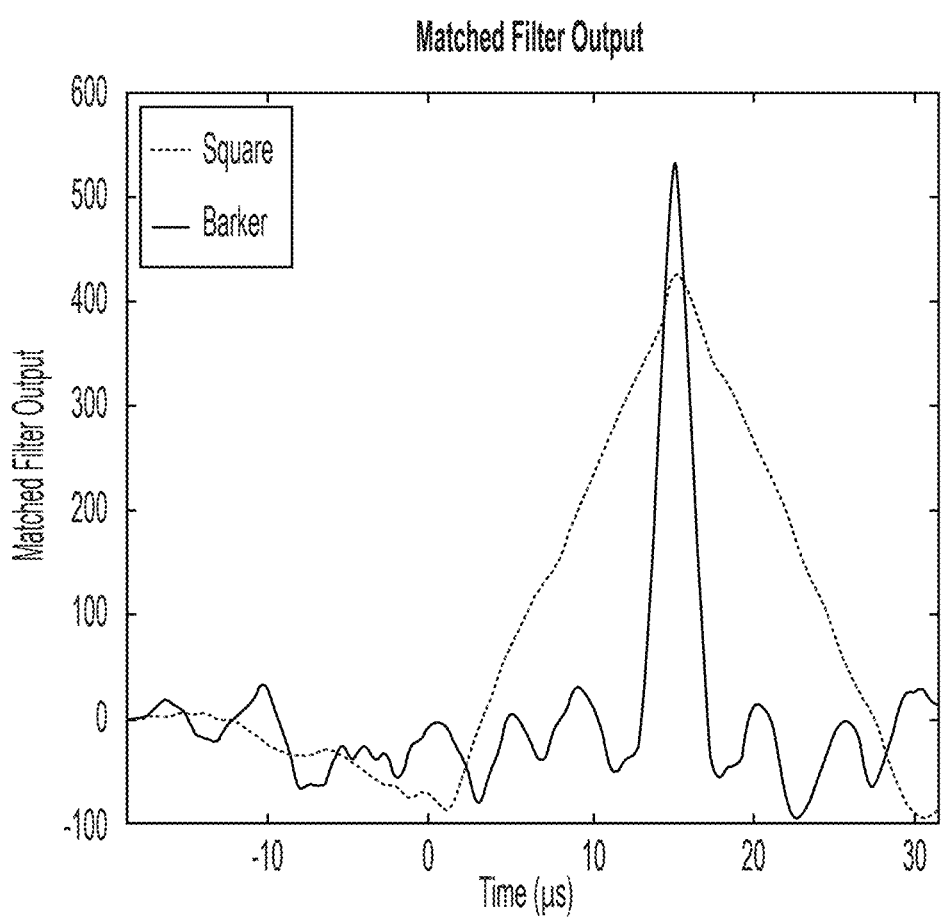
FIG. 12C is a graph of an example shape of a matched filter output from a single Barker code response.

The process of detuning can be used to generate two signs (e.g., positive and negative). Two signs may be used for many pulse compression codes. For example, Barker codes can be generated in the Rydberg vapor system by stepping between two RF frequencies, one slightly below resonance and one slightly above (e.g., see FIGS. 12A-12C). In this system, a few hundred kHz detuning may be optimal, but other detunings can be used depending on the RF amplitude being sensed. For example, higher detunings may be used for stronger fields. FIG. 12A presents a graph of an example Barker encoding process in which frequency modulation is applied to an RF field to generate a coded RF pulse. FIG. 12B presents a graph of an example vapor response to the coded RF field of FIG. 12A, averaged to make a response template. The vapor response corresponds to the response of a vapor of cesium atoms to the coded RF field. FIG. 12C presents a graph of an example shape of a response template output (e.g., matched filter output) from a single Barker code response. The graph represents a matched filter response to an atomic filter response to a Barker code and a square wave, such as the two atomic matched filters in FIG. 12B. The response template output is shaped as expected and temporally narrower than a square pulse.

In certain cases, there are some RF frequencies at which the optical transmission of the vapor does not change when the RF field is turned on or off. An example of these frequencies is shown in the "zero crossing" of FIG. 11C. In some combinations of detunings, this point may shift with the amplitude of the RF field applied. For a Rydberg vapor-based sensor to cover the largest range of RF amplitudes, it is desirable for the point to not shift with RF amplitude. In the three-photon excitation system above, the shift of the zero crossing can be minimized by adjusting the detuning of the 2.26-μm laser signal. However, in some variations, it is preferable for the detunings of the laser signals to be adjusted experimentally to minimize these shifts.

Other combinations of detunings may also be used to generate an EIT-EIA response. For example, the 636-nm and 2.26-μm laser signals may be detuned in (nominally) equal but opposite directions. As another example, all three laser signals may be detuned, such as by detuning the 895-nm and 636-nm laser signals by the same amount and direction but detuning the 2.26-μm laser signal twice that in the other direction.

Figure 13:
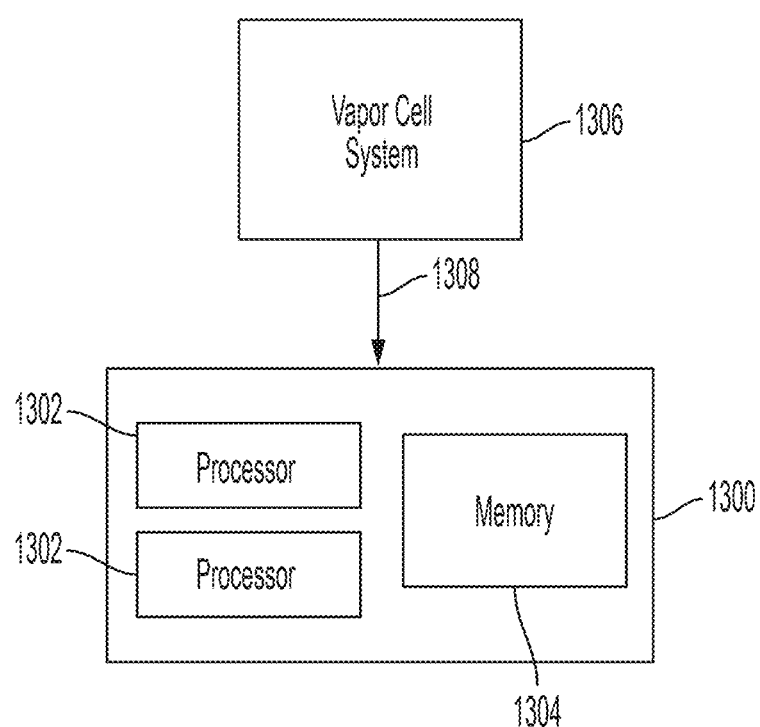
FIG. 13 is a schematic diagram of an example signal processing system that is configured to receive output signals from a vapor cell system.

In some implementations, a signal processing system may be used to determine Doppler shifts in a radar signal. FIG. 13 presents a schematic diagram of an example signal processing system 1300 that is configured to receive output signals 1308 from a vapor cell system 1306. The example signal processing system 1300 and the vapor cell system 1306 are analogous to, respectively, the signal processing system 222 and the vapor cell system 214 described in relation to FIGS. 2A-2E. The example signal processing system 1300 includes one or more processors 1302 and a memory 1304. The memory 1304 stores instructions that, when executed by the one or more processors 1302, cause the one or more processors 1302 to perform operations to determine Doppler shifts in a radar signal, such as those described previously for the signal processing system 222.

For example, the operations of the signal processing system 1300 may include receiving the output signals 1308 from the vapor cell system 1306. The output signals 1308 are based on laser signals and an incoming series of RF pulses interacting with a vapor of the vapor cell system 1306. Moreover, the incoming series of RF signals are received from a target region and based on an outgoing series of RF pulses that have a reference phase modulation. The operations also include generating, based on the output signals 1308, response data that represents a response of the vapor to the laser signals and the incoming series of RF pulses. The response data includes transient response data that represents one or more transient responses of the vapor to respective phase changes in the incoming series of RF pulses. Moreover, the respective phase changes are based on the reference phase modulation of the outgoing series of RF pulses. The operations additionally include determining a Doppler shift in the incoming series of RF pulses based on the transient response data. The Doppler shift results from the outgoing series of RF pulses interacting with an object in the target region. Other operations are possible for the signal processing system 1300. For instance, the signal processing system 1300 may determine a velocity of the object based on the Doppler shift.

In some aspects of what is described, a radar system may be described by the following examples. The radar system includes a vapor cell system that detects phase changes in an incoming series of RF pulses. The incoming series of RF pulses are received by a receiver system of the radar system and are based on an outgoing series of RF pulses that are transmitted by a transmitter system. In certain cases, the radar system may define a bistatic radar system. In certain cases, the radar system may be part of a multi-static radar system that includes multiple instances of the receiver system.

Example 1. A radar system, comprising:
  a transmitter system configured to transmit an outgoing series of RF pulses toward a target region, the outgoing series of RF pulses having a reference phase modulation; and
  a receiver system configured to receive an incoming series of RF pulses that is based on the outgoing series of RF pulses after passing through the target region, the receiver system comprising:
    a vapor cell system comprising a vapor and configured to produce output signals that are based on laser signals and the incoming series of RF pulses interacting with the vapor; and
    a signal processing system configured to receive the output signals and perform operations that comprise:
      generating, based on the output signals, response data that represents a response of the vapor to the laser signals and the incoming series of RF pulses, the response data comprising transient response data that represents one or more transient responses of the vapor to respective phase changes in the incoming series of RF pulses, the respective phase changes based on the reference phase modulation of the outgoing series of RF pulses, and
      determining, based on the transient response data, a Doppler shift in the incoming series of RF pulses, the Doppler shift resulting from the outgoing series of RF pulses interacting with an object in the target region, and
      determining a velocity of the object based on the Doppler shift.

Example 2. The radar system of example 1,
  wherein the phase changes in the incoming series of RF pulses comprise first and second phase changes, the first phase change occurring before the second phase change;
  wherein the transient response data comprises:
    a first subset of transient response data that represents a first transient response of the vapor to the first phase change, and
    a second subset of transient response data that represents a second transient response of the vapor to the second phase change; and
  wherein determining the Doppler shift comprises:
    generating first and second values based on, respectively, the first and second subsets of transient response data, the first value representing a degree to which the vapor responds to the first phase change, the second value representing a degree to which the vapor responds to the second phase change, and
    calculating a difference between the first and second values, the difference representing a detuning of the incoming series of RF pulses relative to a Rydberg electronic transition of the vapor.

Example 3. The radar system of example 2, wherein determining the velocity of the object comprises:
  determining a magnitude of the velocity based on a magnitude of the difference between the first and second values; and
  determining a direction of the velocity based on a sign of the difference, the direction determined relative to an incoming direction along which the incoming series of RF pulses travels to reach the receiver system.

Example 4. The radar system of example 1 or any one of examples 2-3, wherein the reference phase modulation defines a pattern of phase changes in each of the outgoing series of RF pulses, the pattern of phase changes common to all RF pulses in the outgoing series.

Example 5. The radar system of example 4, wherein the pattern of phase changes comprises a pair of phase changes that are equal in magnitude but opposite in sign, the pair of phase changes repeating successively to define the pattern of phase changes.

Example 6. The radar system of example 1 or any one of examples 2-5,
  wherein the incoming series of RF pulses each have a leading pulse edge; and wherein the one or more transient responses of the vapor occur at respective leading pulse edges of the incoming series of RF pulses.

Example 7. The radar system of example 1 or any one of examples 2-6,
wherein the outgoing series of RF pulses have a reference amplitude modulation;
wherein the response data comprises steady-state response data that represents one or more steady-state responses of the vapor to respective amplitude changes in the incoming series of RF pulses, the respective amplitude changes based on the reference amplitude modulation of the outgoing series of RF pulses; and
wherein the Doppler shift is determined based on the transient response data and the steady-state response data.

Example 8. The radar system of example 7,
wherein the incoming series of RF pulses each have a trailing pulse edge; and
wherein the one or more steady-state responses of the vapor occur at respective trailing pulse edges of the incoming series of RF pulses.

Example 9. The radar system of example 1 or any one of examples 2-8,
wherein the vapor cell system comprises a laser system that is configured to generate the laser signals, the laser signals comprising a tunable laser signal;
wherein the operations of the signal processing system comprise transmitting a control signal to the laser system to alter a frequency of the tunable laser signal from an on-resonance frequency, where the tunable laser signal is on-resonance with an optical electronic transition of the vapor, to a detuned frequency, where the tunable laser signal is detuned relative to the optical electronic transition of the vapor; and
wherein the transient response data is generated when the tunable laser signal is at the on-resonance frequency, and the response data comprises detuned transient response data that is generated when the tunable laser signal is at the detuned frequency.

Example 10. The radar system of example 9,
wherein the tunable laser signal is a first tunable laser signal, the detuned frequency is a first detuned frequency, and the control signal is a first control signal;
wherein the laser signals comprise a second tunable laser signal;
wherein the operations of the signal processing system comprise transmitting a second control signal to the laser system to alter a frequency of the second tunable laser signal from the on-resonance frequency, where the second tunable laser signal is on-resonance with the optical electronic transition of the vapor, to a second detuned frequency, wherein the second tunable laser signal is detuned relative to the optical electronic transition of the vapor; and
wherein the detuned transient response data is generated when the first and second tunable laser signals are at, respectively, the first and second detuned frequencies.

Example 11. The radar system of example 10,
wherein a first difference between the first detuned frequency and the on-resonance frequency defines a first detuning of the first tunable laser signal;
wherein a second difference between the second detuned frequency and the on-resonance frequency defines a second detuning of the second tunable laser signal; and
wherein the first and second detunings are equal in magnitude but opposite in sign to symmetrically detune the first and second tunable laser signals about the optical electronic transition of the vapor.

Example 12. The radar system of example 1 or any one of examples 2-11,
wherein the outgoing series of RF pulses share a pulse period in common; and
wherein determining the Doppler shift comprises:
generating a sampled portion of response data by sampling the response data over a sampling period that is based on one or more of the pulse periods,
comparing the sampled portion of response data to each of a plurality of response templates to determine respective degrees of fit, each response template having template data that represents a known response of the vapor to one or more reference RF pulses, the one or more reference RF pulses different for each response template,
selecting one of the response templates based on its degree of fit, and
determining the Doppler shift based on the sampled portion of response data and the template data of the selected response template.

Example 13. The radar system of example 1 or any one of examples 2-12,
wherein each of the outgoing series of RF pulses is divided into a sequence of sub-pulses that have respective phases, the respective phases defined by the reference phase modulation according to a pulse compression protocol; and
wherein the velocity of the object is determined based on the Doppler shift and respective arrival times of one or more target RF pulses in the incoming series of RF pulses.

Example 14. The radar system of example 13, wherein the operations of the signal processing system comprise:
generating, based on the transient response data over time, correlation values for a target RF pulse in the incoming series of RF pulses, wherein:
the target RF pulse is divided into a sequence of target sub-pulses that have respective target phases,
the correlation values represent a correlation of the target sub-pulses, in time, with one or more reference sub-pulses of a reference RF pulse, and
the one or more reference sub-pulses have respective reference phases that are defined by the reference phase modulation according to the pulse compression protocol; and
determining an arrival time of the target RF pulse based on the correlation values.

Example 15. The radar system of example 14,
wherein the operations of the signal processing comprise assigning, based on the transient response data, respective symbols to the target sub-pulses of the target RF pulse, the respective symbols being part of the pulse compression protocol; and
wherein the one or more reference sub-pulses are associated with respective symbols of the pulse compression protocol.

Example 16. The radar system of example 1 or any one of examples 2-15, wherein the operations of the signal processing system comprise determining a distance of the object from the receiver system based on the response data.

Example 17. The radar system of example 1 or any one of examples 2-16, wherein the vapor cell system comprises:
  a laser system configured to generate the laser signals; and
  an optical detector that is configured to generate the output signals in response to receiving optical signals from the vapor, the output signals representing respective intensities of the optical signals.

Example 18. The radar system of example 17,
  wherein the vapor is configured to generate the optical signals in response to the laser signals interacting with the vapor, the vapor having a Rydberg electronic transition that interacts with the incoming series of RF pulses; and
  wherein the optical signals are based on a transmission of one of the laser signals through the vapor.

Example 19. The radar system of example 18,
  wherein the laser signals comprise probe and coupling laser signals; and
  wherein:
    the optical signals are based on a transmission of the probe laser signal through the vapor,
    the probe laser signal is configured to interact with a probe optical transition of the vapor, and
    the coupling laser signal is configured to interact with a coupling optical transition of the vapor.

Example 20. The radar system of example 19,
  wherein the vapor has electronic states that comprise:
    first and second electronic states, and
    first and second Rydberg electronic states;
  wherein the first electronic state, the second electronic state, and the first Rydberg electronic state are progressively higher in energy; and
  wherein:
    the probe optical transition is defined by the first and second electronic states,
    the coupling optical transition is defined by the second electronic state and the first Rydberg electronic state, and
    the Rydberg electronic transition is defined by the first and second Rydberg electronic states.

Example 21. The radar system of example 19,
  wherein the coupling laser signal is a first coupling laser signal, and the coupling optical transition is a first coupling optical transition; and
  wherein the laser signals comprise a second coupling laser signal that is configured to interact with a second coupling optical transition of the vapor.

Example 22. The radar system of example 21,
  wherein the vapor has electronic states that comprise:
    first, second, and third electronic states, and
    first and second Rydberg electronic states;
  wherein the first electronic state, the second electronic state, the third electronic state, and the first Rydberg electronic state are progressively higher in energy; and
  wherein:
    the probe optical transition is defined by the first and second electronic states,
    the first coupling optical transition is defined by the second electronic state and the third electronic state,
    the second coupling optical transition is defined by the third electronic state and the first Rydberg electronic state, and
    the Rydberg electronic transition is defined by the first and second Rydberg electronic states.

In some aspects of what is described, a signal processing system may be described by the following examples. The signal processing system may, in some configurations, be part of a radar system, such as one that includes a transmitter system and a receiver system.

Example 23. A signal processing system, comprising:
  one or more processors; and
  memory storing instructions that, when executed by the one or more processors, cause the one or more processors to perform operations that comprise:
    receiving output signals from a vapor cell system, the output signals based on laser signals and an incoming series of RF pulses interacting with a vapor of the vapor cell system, the incoming series of RF signals received from a target region and based on an outgoing series of RF pulses that have a reference phase modulation;
    generating, based on the output signals, response data that represents a response of the vapor to the laser signals and the incoming series of RF pulses, the response data comprising transient response data that represents one or more transient responses of the vapor to respective phase changes in the incoming series of RF pulses, the respective phase changes based on the reference phase modulation of the outgoing series of RF pulses;
    determining, based on the transient response data, a Doppler shift in the incoming series of RF pulses, the Doppler shift resulting from the outgoing series of RF pulses interacting with an object in the target region; and
    determining a velocity of the object based on the Doppler shift.

Example 24. The signal processing system of example 23,
  wherein the phase changes in the incoming series of RF pulses comprise first and second phase changes, the first phase change occurring before the second phase change;
  wherein the transient response data comprises:
    a first subset of transient response data that represents a first transient response of the vapor to the first phase change, and
    a second subset of transient response data that represents a second transient response of the vapor to the second phase change; and
  wherein determining the Doppler shift comprises:
    generating first and second values based on, respectively, the first and second subsets of transient response data, the first value representing a degree to which the vapor responds to the first phase change, the second value representing a degree to which the vapor responds to the second phase change, and
    calculating a difference between the first and second values, the difference representing a detuning of the incoming series of RF pulses relative to a Rydberg electronic transition of the vapor.

Example 25. The signal processing system of example 24,
  wherein the incoming series of RF signals are received by a receiver system; and
  wherein determining the velocity of the object comprises:

determining a magnitude of the velocity based on a magnitude of the difference between the first and second values; and determining a direction of the velocity based on a sign of the difference, the direction determined relative to an incoming direction along which the incoming series of RF pulses travels to reach the receiver system.

Example 26. The signal processing system of example 23 or any one of examples 24-25, wherein the reference phase modulation defines a pattern of phase changes in each of the outgoing series of RF pulses, the pattern of phase changes common to all RF pulses in the outgoing series.

Example 27. The signal processing system of example 26, wherein the pattern of phase changes comprises a pair of phase changes that are equal in magnitude but opposite in sign, the pair of phase changes repeating successively to define the pattern of phase changes.

Example 28. The signal processing system of example 23 or any one of examples 24-27,
wherein the outgoing series of RF pulses have a reference amplitude modulation;
wherein the response data comprises steady-state response data that represents one or more steady-state responses of the vapor to respective amplitude changes in the incoming series of RF pulses, the respective amplitude changes based on the reference amplitude modulation of the outgoing series of RF pulses; and
wherein the Doppler shift is determined based on the transient response data and the steady-state response data.

Example 29. The signal processing system of example 23 or any one of examples 24-28,
wherein the vapor cell system comprises a laser system that is configured to generate the laser signals, the laser signals comprising a tunable laser signal;
wherein the operations comprise transmitting a control signal to the laser system to alter a frequency of the tunable laser signal from an on-resonance frequency, where the tunable laser signal is on-resonance with an optical electronic transition of the vapor, to a detuned frequency, where the tunable laser signal is detuned relative to the optical electronic transition of the vapor; and
wherein the generating the response data comprises:
generating the transient response data when the tunable laser signal is at the on-resonance frequency, and
generating detuned transient response data when the tunable laser signal is at the detuned frequency.

Example 30. The signal processing system of example 29,
wherein the tunable laser signal is a first tunable laser signal, the detuned frequency is a first detuned frequency, and the control signal is a first control signal;
wherein the laser signals comprise a second tunable laser signal;
wherein the operations comprise transmitting a second control signal to the laser system to alter a frequency of the second tunable laser signal from the on-resonance frequency, where the second tunable laser signal is on-resonance with the optical electronic transition of the vapor, to a second detuned frequency, wherein the second tunable laser signal is detuned relative to the optical electronic transition of the vapor; and
wherein the detuned transient response data is generated when the first and second tunable laser signals are at, respectively, the first and second detuned frequencies.

Example 31. The signal processing system of example 30,
wherein a first difference between the first detuned frequency and the on-resonance frequency defines a first detuning of the first tunable laser signal;
wherein a second difference between the second detuned frequency and the on-resonance frequency defines a second detuning of the second tunable laser signal; and
wherein the first and second detunings are equal in magnitude but opposite in sign to symmetrically detune the first and second tunable laser signals about the optical electronic transition of the vapor.

Example 32. The signal processing system of example 23 or any one of examples 24-31,
wherein the outgoing series of RF pulses share a pulse period in common; and
wherein determining the Doppler shift comprises:
generating a sampled portion of response data by sampling the response data over a sampling period that is based on one or more of the pulse periods,
comparing the sampled portion of response data to each of a plurality of response templates to determine respective degrees of fit, each response template having template data that represents a known response of the vapor to one or more reference RF pulses, the one or more reference RF pulses different for each response template,
selecting one of the response templates based on its degree of fit, and
determining the Doppler shift based on the sampled portion of response data and the template data of the selected response template.

Example 33. The signal processing system of example 23 or any one of examples 24-32,
wherein each of the outgoing series of RF pulses is divided into a sequence of sub-pulses that have respective phases, the respective phases defined by the reference phase modulation according to a pulse compression protocol; and
wherein the velocity of the object is determined based on the Doppler shift and respective arrival times of one or more target RF pulses in the incoming series of RF pulses.

Example 34. The signal processing system of example 33, comprising:
generating, based on the transient response data over time, correlation values for a target RF pulse in the incoming series of RF pulses, wherein:
the target RF pulse is divided into a sequence of target sub-pulses that have respective target phases,
the correlation values represent a correlation of the target sub-pulses, in time, with one or more reference sub-pulses of a reference RF pulse, and
the one or more reference sub-pulses have respective reference phases that are defined by the reference phase modulation according to the pulse compression protocol; and
determining an arrival time of the target RF pulse based on the correlation values.

Example 35. The signal processing system of example 34, comprising:
assigning, based on the transient response data, respective symbols to the target sub-pulses of the target RF pulse, the respective symbols being part of the pulse compression protocol, the one or more reference sub-pulses associated with respective symbols of the pulse compression protocol.

Example 36. The signal processing system of example 23 or any one of examples 24-35,
wherein the incoming series of RF signals are received by a receiver system; and
wherein the operations comprise determining a distance of the object from the receiver system based on the response data.

Example 37. The signal processing system of example 23 or any one of examples 24-36, wherein the vapor cell system comprises:
a laser system configured to generate the laser signals; and
an optical detector that is configured to generate the output signals in response to receiving optical signals from the vapor, the output signals representing respective intensities of the optical signals.

Example 38. The signal processing system of example 37, wherein the vapor is configured to generate the optical signals in response to the laser signals interacting with the vapor, the vapor having a Rydberg electronic transition that interacts with the incoming series of RF pulses; and
wherein the optical signals are based on a transmission of one of the laser signals through the vapor.

Example 39. The signal processing system of example 38, wherein the laser signals comprise probe and coupling laser signals; and
wherein:
the optical signals are based on a transmission of the probe laser signal through the vapor,
the probe laser signal is configured to interact with a probe optical transition of the vapor, and
the coupling laser signal is configured to interact with a coupling optical transition of the vapor.

Example 40. The signal processing system of example 39, wherein the vapor has electronic states that comprise:
first and second electronic states, and
first and second Rydberg electronic states;
wherein the first electronic state, the second electronic state, and the first Rydberg electronic state are progressively higher in energy; and
wherein:
the probe optical transition is defined by the first and second electronic states,
the coupling optical transition is defined by the second electronic state and the first Rydberg electronic state, and
the Rydberg electronic transition is defined by the first and second Rydberg electronic states.

Example 41. The signal processing system of example 39, wherein the coupling laser signal is a first coupling laser signal, and the coupling optical transition is a first coupling optical transition; and
wherein the laser signals comprise a second coupling laser signal that is configured to interact with a second coupling optical transition of the vapor.

Example 42. The signal processing system of example 41, wherein the vapor has electronic states that comprise:
first, second, and third electronic states, and
first and second Rydberg electronic states;
wherein the first electronic state, the second electronic state, the third electronic state, and the first Rydberg electronic state are progressively higher in energy; and
wherein:
the probe optical transition is defined by the first and second electronic states,
the first coupling optical transition is defined by the second electronic state and the third electronic state,
the second coupling optical transition is defined by the third electronic state and the first Rydberg electronic state, and
the Rydberg electronic transition is defined by the first and second Rydberg electronic states.

In some aspects of what is described, a radar method may be described by the following examples. The radar method includes detecting phase changes in an incoming series of RF pulses using a vapor cell system. The incoming series of RF pulses is received by a receiver system and are based on an outgoing series of RF pulses that are transmitted by a transmitter system. In certain cases, the receiver system and the transmitter system may be part of a radar system, such as a bistatic or multi-static radar system. The multi-static radar system, in some configurations, may include multiple instances of the receiver system.

Example 43. A radar method, comprising:
by operation of a transmitter system, transmitting an outgoing series of RF pulses toward a target region, the outgoing series of RF pulses having a reference phase modulation;
by operation of a receiver system, receiving an incoming series of RF pulses that is based on the outgoing series of RF pulses after passing through the target region, wherein receiving the incoming series of RF pulses comprises:
interacting the incoming series of RF pulses with a vapor of a vapor cell system, the vapor cell system part of the receiver system, and
interacting laser signals with the vapor;
by operation of the vapor cell system, producing output signals that are based on incoming series of RF pulses and the laser signals interacting with the vapor; and
by operation of a signal processing system of the receiver system:
generating, based on the output signals, response data that represents a response of the vapor to the laser signals and the incoming series of RF pulses, the response data comprising transient response data that represents one or more transient responses of the vapor to respective phase changes in the incoming series of RF pulses, the respective phase changes based on the reference phase modulation of the outgoing series of RF pulses, and
determining, based on the transient response data, a Doppler shift in the incoming series of RF pulses, the Doppler shift resulting from the outgoing series of RF pulses interacting with an object in the target region, and
determining a velocity of the object based on the Doppler shift.

Example 44. The radar method of example 43,
  wherein the phase changes in the incoming series of RF pulses comprise first and second phase changes, the first phase change occurring before the second phase change;
  wherein the transient response data comprises:
    a first subset of transient response data that represents a first transient response of the vapor to the first phase change, and
    a second subset of transient response data that represents a second transient response of the vapor to the second phase change; and
  wherein determining the Doppler shift comprises:
    generating first and second values based on, respectively, the first and second subsets of transient response data, the first value representing a degree to which the vapor responds to the first phase change, the second value representing a degree to which the vapor responds to the second phase change, and
    calculating a difference between the first and second values, the difference representing a detuning of the incoming series of RF pulses relative to a Rydberg electronic transition of the vapor.
Example 45. The radar method of example 44, wherein determining the velocity of the object comprises:
  determining a magnitude of the velocity based on a magnitude of the difference between the first and second values; and
  determining a direction of the velocity based on a sign of the difference, the direction determined relative to an incoming direction along which the incoming series of RF pulses travels to reach the receiver system.
Example 46. The radar method of example 43 or any one of examples 44-45, wherein the reference phase modulation defines a pattern of phase changes in each of the outgoing series of RF pulses, the pattern of phase changes common to all RF pulses in the outgoing series.
Example 47. The radar method of example 46, wherein the pattern of phase changes comprises a pair of phase changes that are equal in magnitude but opposite in sign, the pair of phase changes repeating successively to define the pattern of phase changes.
Example 48. The radar method of example 43 or any one of examples 44-47,
  wherein the incoming series of RF pulses each have a leading pulse edge; and
  wherein the one or more transient responses of the vapor occur at respective leading pulse edges of the incoming series of RF pulses.
Example 49. The radar method of example 43 or any one of examples 44-48,
  wherein the outgoing series of RF pulses have a reference amplitude modulation;
  wherein the response data comprises steady-state response data that represents one or more steady-state responses of the vapor to respective amplitude changes in the incoming series of RF pulses, the respective amplitude changes based on the reference amplitude modulation of the outgoing series of RF pulses; and
  wherein the Doppler shift is determined based on the transient response data and the steady-state response data.
Example 50. The radar method of example 49,
  wherein the incoming series of RF pulses each have a trailing pulse edge; and
  wherein the one or more steady-state responses of the vapor occur at respective trailing pulse edges of the incoming series of RF pulses.
Example 51. The radar method of example 43 or any one of examples 44-50,
  wherein a laser system of the vapor cell system generates the laser signals, and the laser signals comprise a tunable laser signal;
  wherein the radar method comprises:
    by operation of the signal processing system, transmitting a control signal to the laser system to alter a frequency of the tunable laser signal from an on-resonance frequency, where the tunable laser signal is on-resonance with an optical electronic transition of the vapor, to a detuned frequency, where the tunable laser signal is detuned relative to the optical electronic transition of the vapor; and
  wherein the generating the response data comprises:
    generating the transient response data when the tunable laser signal is at the on-resonance frequency, and
    generating detuned transient response data when the tunable laser signal is at the detuned frequency.
Example 52. The radar method of example 51,
  wherein the tunable laser signal is a first tunable laser signal, the detuned frequency is a first detuned frequency, and the control signal is a first control signal;
  wherein the laser signals comprise a second tunable laser signal;
  wherein the radar method comprises:
    by operation of the signal processing system, transmitting a second control signal to the laser system to alter a frequency of the second tunable laser signal from the on-resonance frequency, where the second tunable laser signal is on-resonance with the optical electronic transition of the vapor, to a second detuned frequency, wherein the second tunable laser signal is detuned relative to the optical electronic transition of the vapor; and
  wherein the detuned transient response data is generated when the first and second tunable laser signals are at, respectively, the first and second detuned frequencies.
Example 53. The radar method of example 52,
  wherein a first difference between the first detuned frequency and the on-resonance frequency defines a first detuning of the first tunable laser signal;
  wherein a second difference between the second detuned frequency and the on-resonance frequency defines a second detuning of the second tunable laser signal; and
  wherein the first and second detunings are equal in magnitude but opposite in sign to symmetrically detune the first and second tunable laser signals about the optical electronic transition of the vapor.
Example 54. The radar method of example 43 or any one of examples 44-53,
  wherein the outgoing series of RF pulses share a pulse period in common; and wherein determining the Doppler shift comprises:
  generating a sampled portion of response data by sampling the response data over a sampling period that is based on one or more of the pulse periods,
  comparing the sampled portion of response data to each of a plurality of response templates to determine respective degrees of fit, each response template having template data that represents a known response of the vapor to one or more reference RF pulses, the one or more reference RF pulses different for each response template,
  selecting one of the response templates based on its degree of fit, and
  determining the Doppler shift based on the sampled portion of response data and the template data of the selected response template.

Example 55. The radar method of example 43 or any one of examples 44-54,
  wherein each of the outgoing series of RF pulses is divided into a sequence of sub-pulses that have respective phases, the respective phases defined by the reference phase modulation according to a pulse compression protocol; and
  wherein the velocity of the object is determined based on the Doppler shift and respective arrival times of one or more target RF pulses in the incoming series of RF pulses.

Example 56. The radar method of example 55, comprising:
  by operation of the signal processing system:
    generating, based on the transient response data over time, correlation values for a target RF pulse in the incoming series of RF pulses, wherein:
      the target RF pulse is divided into a sequence of target sub-pulses that have respective target phases,
      the correlation values represent a correlation of the target sub-pulses, in time, with one or more reference sub-pulses of a reference RF pulse, and
      the one or more reference sub-pulses have respective reference phases that are defined by the reference phase modulation according to the pulse compression protocol; and
    determining an arrival time of the target RF pulse based on the correlation values.

Example 57. The radar method of example 56, comprising:
  assigning, by operation of the signal processing system and based on the transient response data, respective symbols to the target sub-pulses of the target RF pulse, the respective symbols being part of the pulse compression protocol;
  wherein the one or more reference sub-pulses are associated with respective symbols of the pulse compression protocol.

Example 58. The radar method of example 43 or any one of examples 44-57, comprising:
  by operation of the signal processing system, determining a distance of the object from the receiver system based on the response data.

Example 59. The radar method of example 43 or any one of examples 44-58,
  wherein the vapor cell system comprises a laser system and an optical detector; and
  wherein producing the output signals comprises:
    generating the laser signals by operation of the laser system,
    generating, by operation of the vapor, optical signals in response to the laser signals interacting with the vapor, the vapor having a Rydberg electronic transition that interacts with the incoming series of RF pulses, the optical signals based on a transmission of one of the laser signals through the vapor, and
    generating, by operation of the optical detector, the output signals in response to receiving the optical signals at the optical detector, the output signals representing respective intensities of the optical signals.

Example 60. The radar method of example 59,
  wherein the vapor has a Rydberg electronic transition that interacts with the incoming series of RF pulses; and
  wherein the optical signals are based on a transmission of one of the laser signals through the vapor.

Example 61. The radar method of example 60,
  wherein the laser signals comprise probe and coupling laser signals; and
  wherein:
    the optical signals are based on a transmission of the probe laser signal through the vapor,
    the probe laser signal is configured to interact with a probe optical transition of the vapor, and
    the coupling laser signal is configured to interact with a coupling optical transition of the vapor.

Example 62. The radar method of example 61,
  wherein the vapor has electronic states that comprise:
    first and second electronic states, and
    first and second Rydberg electronic states;
  wherein the first electronic state, the second electronic state, and the first Rydberg electronic state are progressively higher in energy; and
  wherein:
    the probe optical transition is defined by the first and second electronic states,
    the coupling optical transition is defined by the second electronic state and the first Rydberg electronic state, and
    the Rydberg electronic transition is defined by the first and second Rydberg electronic states.

Example 63. The radar method of example 61,
  wherein the coupling laser signal is a first coupling laser signal, and the coupling optical transition is a first coupling optical transition; and
  wherein the laser signals comprise a second coupling laser signal that is configured to interact with a second coupling optical transition of the vapor.

Example 64. The radar method of example 63,
  wherein the vapor has electronic states that comprise:
    first, second, and third electronic states, and
    first and second Rydberg electronic states;
  wherein the first electronic state, the second electronic state, the third electronic state, and the first Rydberg electronic state are progressively higher in energy; and
  wherein:
    the probe optical transition is defined by the first and second electronic states,
    the first coupling optical transition is defined by the second electronic state and the third electronic state, the second coupling optical transition is defined by the third electronic state and the first Rydberg electronic state, and the Rydberg electronic transition is defined by the first and second Rydberg electronic states.

In some aspects of what is described, a signal processing method may be described by the following examples. The signal processing method may, in some implementations, be part of a radar method, such as one that includes a transmitter system and a receiver system.

Example 65. A signal processing method, comprising:
receiving output signals from a vapor cell system, the output signals based on laser signals and an incoming series of RF pulses interacting with a vapor of the vapor cell system, the incoming series of RF signals received from a target region and based on an outgoing series of RF pulses that have a reference phase modulation;

generating, based on the output signals, response data that represents a response of the vapor to the laser signals and the incoming series of RF pulses, the response data comprising transient response data that represents one or more transient responses of the vapor to respective phase changes in the incoming series of RF pulses, the respective phase changes based on the reference phase modulation of the outgoing series of RF pulses;

determining, based on the transient response data, a Doppler shift in the incoming series of RF pulses, the Doppler shift resulting from the outgoing series of RF pulses interacting with an object in the target region; and determining a velocity of the object based on the Doppler shift.

Example 66. The signal processing method of example 65,
wherein the phase changes in the incoming series of RF pulses comprise first and second phase changes, the first phase change occurring before the second phase change;

wherein the transient response data comprises:
a first subset of transient response data that represents a first transient response of the vapor to the first phase change, and
a second subset of transient response data that represents a second transient response of the vapor to the second phase change; and wherein determining the Doppler shift comprises:
generating first and second values based on, respectively, the first and second subsets of transient response data, the first value representing a degree to which the vapor responds to the first phase change, the second value representing a degree to which the vapor responds to the second phase change, and
calculating a difference between the first and second values, the difference representing a detuning of the incoming series of RF pulses relative to a Rydberg electronic transition of the vapor.

Example 67. The signal processing method of example 66,
wherein the incoming series of RF signals are received by a receiver system; and
wherein determining the velocity of the object comprises:
determining a magnitude of the velocity based on a magnitude of the difference between the first and second values; and determining a direction of the velocity based on a sign of the difference, the direction determined relative to an incoming direction along which the incoming series of RF pulses travels to reach the receiver system.

Example 68. The signal processing method of example 65 or any one of examples 66-67, wherein the reference phase modulation defines a pattern of phase changes in each of the outgoing series of RF pulses, the pattern of phase changes common to all RF pulses in the outgoing series.

Example 69. The signal processing method of example 68, wherein the pattern of phase changes comprises a pair of phase changes that are equal in magnitude but opposite in sign, the pair of phase changes repeating successively to define the pattern of phase changes.

Example 70. The signal processing method of example 65 or any one of examples 66-69,
wherein the outgoing series of RF pulses have a reference amplitude modulation;
wherein the response data comprises steady-state response data that represents one or more steady-state responses of the vapor to respective amplitude changes in the incoming series of RF pulses, the respective amplitude changes based on the reference amplitude modulation of the outgoing series of RF pulses; and
wherein the Doppler shift is determined based on the transient response data and the steady-state response data.

Example 71. The signal processing method of example 65 or any one of examples 66-70,
wherein the vapor cell system comprises a laser system that is configured to generate the laser signals, the laser signals comprising a tunable laser signal;
wherein the signal processing method comprises transmitting a control signal to the laser system to alter a frequency of the tunable laser signal from an on-resonance frequency, where the tunable laser signal is on-resonance with an optical electronic transition of the vapor, to a detuned frequency, where the tunable laser signal is detuned relative to the optical electronic transition of the vapor; and
wherein the generating the response data comprises:
generating the transient response data when the tunable laser signal is at the on-resonance frequency, and
generating detuned transient response data when the tunable laser signal is at the detuned frequency.

Example 72. The signal processing method of example 71,
wherein the tunable laser signal is a first tunable laser signal, the detuned frequency is a first detuned frequency, and the control signal is a first control signal;
wherein the laser signals comprise a second tunable laser signal;
wherein the signal processing method comprises transmitting a second control signal to the laser system to alter a frequency of the second tunable laser signal from the on-resonance frequency, where the second tunable laser signal is on-resonance with the optical electronic transition of the vapor, to a second detuned frequency, wherein the second tunable laser signal is detuned relative to the optical electronic transition of the vapor; and wherein the detuned transient response data is generated when the first and second tunable laser signals are at, respectively, the first and second detuned frequencies.

Example 73. The signal processing method of example 72,
wherein a first difference between the first detuned frequency and the on-resonance frequency defines a first detuning of the first tunable laser signal;
wherein a second difference between the second detuned frequency and the on-resonance frequency defines a second detuning of the second tunable laser signal; and
wherein the first and second detunings are equal in magnitude but opposite in sign to symmetrically detune the first and second tunable laser signals about the optical electronic transition of the vapor.

Example 74. The signal processing method of example 65 or any one of examples 66-73,
wherein the outgoing series of RF pulses share a pulse period in common; and
wherein determining the Doppler shift comprises:
    generating a sampled portion of response data by sampling the response data over a sampling period that is based on one or more of the pulse periods,
    comparing the sampled portion of response data to each of a plurality of response templates to determine respective degrees of fit, each response template having template data that represents a known response of the vapor to one or more reference RF pulses, the one or more reference RF pulses different for each response template,
    selecting one of the response templates based on its degree of fit, and
    determining the Doppler shift based on the sampled portion of response data and the template data of the selected response template.

Example 75. The signal processing method of example 65 or any one of examples 66-74,
wherein each of the outgoing series of RF pulses is divided into a sequence of sub-pulses that have respective phases, the respective phases defined by the reference phase modulation according to a pulse compression protocol; and
wherein the velocity of the object is determined based on the Doppler shift and respective arrival times of one or more target RF pulses in the incoming series of RF pulses.

Example 76. The signal processing method of example 75, comprising:
generating, based on the transient response data over time, correlation values for a target RF pulse in the incoming series of RF pulses, wherein:
    the target RF pulse is divided into a sequence of target sub-pulses that have respective target phases,
    the correlation values represent a correlation of the target sub-pulses, in time, with one or more reference sub-pulses of a reference RF pulse, and
    the one or more reference sub-pulses have respective reference phases that are defined by the reference phase modulation according to the pulse compression protocol; and
determining an arrival time of the target RF pulse based on the correlation values.

Example 77. The signal processing method of example 76, comprising:
assigning, based on the transient response data, respective symbols to the target sub-pulses of the target RF pulse, the respective symbols being part of the pulse compression protocol, the one or more reference sub-pulses associated with respective symbols of the pulse compression protocol.

Example 78. The signal processing method of example 65 or any one of examples 66-77,
wherein the incoming series of RF signals are received by a receiver system; and
wherein the signal processing method comprises determining a distance of the object from the receiver system based on the response data.

Example 79. The signal processing method of example 65 or any one of examples 66-78, wherein the vapor cell system comprises:
a laser system configured to generate the laser signals; and
an optical detector that is configured to generate the output signals in response to receiving optical signals from the vapor, the output signals representing respective intensities of the optical signals.

Example 80. The signal processing method of example 79,
wherein the vapor is configured to generate the optical signals in response to the laser signals interacting with the vapor, the vapor having a Rydberg electronic transition that interacts with the incoming series of RF pulses; and
wherein the optical signals are based on a transmission of one of the laser signals through the vapor.

Example 81. The signal processing method of example 80,
wherein the laser signals comprise probe and coupling laser signals; and
wherein:
    the optical signals are based on a transmission of the probe laser signal through the vapor,
    the probe laser signal is configured to interact with a probe optical transition of the vapor, and
    the coupling laser signal is configured to interact with a coupling optical transition of the vapor.

Example 82. The signal processing method of example 81,
wherein the vapor has electronic states that comprise:
    first and second electronic states, and
    first and second Rydberg electronic states;
wherein the first electronic state, the second electronic state, and the first Rydberg electronic state are progressively higher in energy; and
wherein:
    the probe optical transition is defined by the first and second electronic states,
    the coupling optical transition is defined by the second electronic state and the first Rydberg electronic state, and
    the Rydberg electronic transition is defined by the first and second Rydberg electronic states.

Example 83. The signal processing method of example 81,
wherein the coupling laser signal is a first coupling laser signal, and the coupling optical transition is a first coupling optical transition; and
wherein the laser signals comprise a second coupling laser signal that is configured to interact with a second coupling optical transition of the vapor.

Example 84. The signal processing method of example 83,
wherein the vapor has electronic states that comprise:
first, second, and third electronic states, and
first and second Rydberg electronic states;
wherein the first electronic state, the second electronic state, the third electronic state, and the first Rydberg electronic state are progressively higher in energy; and
wherein:
the probe optical transition is defined by the first and second electronic states,
the first coupling optical transition is defined by the second electronic state and the third electronic state,
the second coupling optical transition is defined by the third electronic state and the first Rydberg electronic state, and
the Rydberg electronic transition is defined by the first and second Rydberg electronic states.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A radar method, comprising:
by operation of a transmitter system, transmitting an outgoing series of radio frequency (RF) pulses toward a target region, the outgoing series of RF pulses having a reference phase modulation;
by operation of a receiver system, receiving an incoming series of RF pulses that is based on the outgoing series of RF pulses after passing through the target region, wherein receiving the incoming series of RF pulses comprises:
interacting the incoming series of RF pulses with a vapor of a vapor cell system, the vapor cell system part of the receiver system, and
interacting laser signals with the vapor;
by operation of the vapor cell system, producing output signals that are based on incoming series of RF pulses and the laser signals interacting with the vapor; and
by operation of a signal processing system of the receiver system:
generating, based on the output signals, response data that represents a response of the vapor to the laser signals and the incoming series of RF pulses, the response data comprising transient response data that represents one or more transient responses of the vapor to respective phase changes in the incoming series of RF pulses, the respective phase changes based on the reference phase modulation of the outgoing series of RF pulses, and
determining, based on the transient response data, a Doppler shift in the incoming series of RF pulses, the Doppler shift resulting from the outgoing series of RF pulses interacting with an object in the target region, and
determining a velocity of the object based on the Doppler shift.

2. The radar method of claim 1,
wherein the phase changes in the incoming series of RF pulses comprise first and second phase changes, the first phase change occurring before the second phase change;
wherein the transient response data comprises:
a first subset of transient response data that represents a first transient response of the vapor to the first phase change, and
a second subset of transient response data that represents a second transient response of the vapor to the second phase change; and
wherein determining the Doppler shift comprises:
generating first and second values based on, respectively, the first and second subsets of transient response data, the first value representing a degree to which the vapor responds to the first phase change, the second value representing a degree to which the vapor responds to the second phase change, and
calculating a difference between the first and second values, the difference representing a detuning of the incoming series of RF pulses relative to a Rydberg electronic transition of the vapor.

3. The radar method of claim 2, wherein determining the velocity of the object comprises:
determining a magnitude of the velocity based on a magnitude of the difference between the first and second values; and
determining a direction of the velocity based on a sign of the difference, the direction determined relative to an incoming direction along which the incoming series of RF pulses travels to reach the receiver system.

4. The radar method of claim 1, wherein the reference phase modulation defines a pattern of phase changes in each of the outgoing series of RF pulses, the pattern of phase changes common to all RF pulses in the outgoing series.

5. The radar method of claim 4, wherein the pattern of phase changes comprises a pair of phase changes that are equal in magnitude but opposite in sign, the pair of phase changes repeating successively to define the pattern of phase changes.

6. The radar method of claim 1,
wherein the incoming series of RF pulses each have a leading pulse edge; and
wherein the one or more transient responses of the vapor occur at respective leading pulse edges of the incoming series of RF pulses.

7. The radar method of claim 1,
wherein the outgoing series of RF pulses have a reference amplitude modulation;

wherein the response data comprises steady-state response data that represents one or more steady-state responses of the vapor to respective amplitude changes in the incoming series of RF pulses, the respective amplitude changes based on the reference amplitude modulation of the outgoing series of RF pulses; and wherein the Doppler shift is determined based on the transient response data and the steady-state response data.

8. The radar method of claim 7,
wherein the incoming series of RF pulses each have a trailing pulse edge; and
wherein the one or more steady-state responses of the vapor occur at respective trailing pulse edges of the incoming series of RF pulses.

9. The radar method of claim 1,
wherein a laser system of the vapor cell system generates the laser signals, and the laser signals comprise a tunable laser signal;
wherein the radar method comprises:
by operation of the signal processing system, transmitting a control signal to the laser system to alter a frequency of the tunable laser signal from an on-resonance frequency, where the tunable laser signal is on-resonance with an optical electronic transition of the vapor, to a detuned frequency, where the tunable laser signal is detuned relative to the optical electronic transition of the vapor; and
wherein the generating the response data comprises:
generating the transient response data when the tunable laser signal is at the on-resonance frequency, and
generating detuned transient response data when the tunable laser signal is at the detuned frequency.

10. The radar method of claim 9,
wherein the tunable laser signal is a first tunable laser signal, the detuned frequency is a first detuned frequency, and the control signal is a first control signal;
wherein the laser signals comprise a second tunable laser signal;
wherein the radar method comprises:
by operation of the signal processing system, transmitting a second control signal to the laser system to alter a frequency of the second tunable laser signal from the on-resonance frequency, where the second tunable laser signal is on-resonance with the optical electronic transition of the vapor, to a second detuned frequency, wherein the second tunable laser signal is detuned relative to the optical electronic transition of the vapor; and
wherein the detuned transient response data is generated when the first and second tunable laser signals are at, respectively, the first and second detuned frequencies.

11. The radar method of claim 10,
wherein a first difference between the first detuned frequency and the on-resonance frequency defines a first detuning of the first tunable laser signal;
wherein a second difference between the second detuned frequency and the on-resonance frequency defines a second detuning of the second tunable laser signal; and
wherein the first and second detunings are equal in magnitude but opposite in sign to symmetrically detune the first and second tunable laser signals about the optical electronic transition of the vapor.

12. The radar method of claim 1,
wherein the outgoing series of RF pulses share a pulse period in common; and wherein determining the Doppler shift comprises:
generating a sampled portion of response data by sampling the response data over a sampling period that is based on one or more of the pulse periods,
comparing the sampled portion of response data to each of a plurality of response templates to determine respective degrees of fit, each response template having template data that represents a known response of the vapor to one or more reference RF pulses, the one or more reference RF pulses different for each response template,
selecting one of the response templates based on its degree of fit, and
determining the Doppler shift based on the sampled portion of response data and the template data of the selected response template.

13. The radar method of claim 1,
wherein each of the outgoing series of RF pulses is divided into a sequence of sub-pulses that have respective phases, the respective phases defined by the reference phase modulation according to a pulse compression protocol; and
wherein the velocity of the object is determined based on the Doppler shift and respective arrival times of one or more target RF pulses in the incoming series of RF pulses.

14. The radar method of claim 13, comprising:
by operation of the signal processing system:
generating, based on the transient response data over time, correlation values for a target RF pulse in the incoming series of RF pulses, wherein:
the target RF pulse is divided into a sequence of target sub-pulses that have respective target phases,
the correlation values represent a correlation of the target sub-pulses, in time, with one or more reference sub-pulses of a reference RF pulse, and
the one or more reference sub-pulses have respective reference phases that are defined by the reference phase modulation according to the pulse compression protocol; and
determining an arrival time of the target RF pulse based on the correlation values.

15. The radar method of claim 14, comprising:
assigning, by operation of the signal processing system and based on the transient response data, respective symbols to the target sub-pulses of the target RF pulse, the respective symbols being part of the pulse compression protocol;
wherein the one or more reference sub-pulses are associated with respective symbols of the pulse compression protocol.

16. The radar method of claim 1, comprising:
by operation of the signal processing system, determining a distance of the object from the receiver system based on the response data.

17. The radar method of claim 1,
wherein the vapor cell system comprises a laser system and an optical detector; and
wherein producing the output signals comprises:
generating the laser signals by operation of the laser system,
generating, by operation of the vapor, optical signals in response to the laser signals interacting with the vapor, the vapor having a Rydberg electronic transition that interacts with the incoming series of RF pulses, the optical signals based on a transmission of one of the laser signals through the vapor, and generating, by operation of the optical detector, the output signals in response to receiving the optical signals at the optical detector, the output signals representing respective intensities of the optical signals.

18. A signal processing method, comprising:

receiving output signals from a vapor cell system, the output signals based on laser signals and an incoming series of radio frequency (RF) pulses interacting with a vapor of the vapor cell system, the incoming series of RF signals received from a target region and based on an outgoing series of RF pulses that have a reference phase modulation;

generating, based on the output signals, response data that represents a response of the vapor to the laser signals and the incoming series of RF pulses, the response data comprising transient response data that represents one or more transient responses of the vapor to respective phase changes in the incoming series of RF pulses, the respective phase changes based on the reference phase modulation of the outgoing series of RF pulses;

determining, based on the transient response data, a Doppler shift in the incoming series of RF pulses, the Doppler shift resulting from the outgoing series of RF pulses interacting with an object in the target region; and determining a velocity of the object based on the Doppler shift.

19. The signal processing method of claim 18, wherein the phase changes in the incoming series of RF pulses comprise first and second phase changes, the first phase change occurring before the second phase change;

wherein the transient response data comprises:
 a first subset of transient response data that represents a first transient response of the vapor to the first phase change, and
 a second subset of transient response data that represents a second transient response of the vapor to the second phase change; and wherein determining the Doppler shift comprises:
 generating first and second values based on, respectively, the first and second subsets of transient response data, the first value representing a degree to which the vapor responds to the first phase change, the second value representing a degree to which the vapor responds to the second phase change, and
 calculating a difference between the first and second values, the difference representing a detuning of the incoming series of RF pulses relative to a Rydberg electronic transition of the vapor.

20. The signal processing method of claim 19, wherein the incoming series of RF signals are received by a receiver system; and wherein determining the velocity of the object comprises:
 determining a magnitude of the velocity based on a magnitude of the difference between the first and second values; and
 determining a direction of the velocity based on a sign of the difference, the direction determined relative to an incoming direction along which the incoming series of RF pulses travels to reach the receiver system.

21. The signal processing method of claim 18, wherein the reference phase modulation defines a pattern of phase changes in each of the outgoing series of RF pulses, the pattern of phase changes common to all RF pulses in the outgoing series.

22. The signal processing method of claim 21, wherein the pattern of phase changes comprises a pair of phase changes that are equal in magnitude but opposite in sign, the pair of phase changes repeating successively to define the pattern of phase changes.

23. The signal processing method of claim 18, wherein the outgoing series of RF pulses have a reference amplitude modulation;

wherein the response data comprises steady-state response data that represents one or more steady-state responses of the vapor to respective amplitude changes in the incoming series of RF pulses, the respective amplitude changes based on the reference amplitude modulation of the outgoing series of RF pulses; and wherein the Doppler shift is determined based on the transient response data and the steady-state response data.

24. The signal processing method of claim 18, wherein the vapor cell system comprises a laser system that is configured to generate the laser signals, the laser signals comprising a tunable laser signal;

wherein the signal processing method comprises transmitting a control signal to the laser system to alter a frequency of the tunable laser signal from an on-resonance frequency, where the tunable laser signal is on-resonance with an optical electronic transition of the vapor, to a detuned frequency, where the tunable laser signal is detuned relative to the optical electronic transition of the vapor; and wherein the generating the response data comprises:
 generating the transient response data when the tunable laser signal is at the on-resonance frequency, and
 generating detuned transient response data when the tunable laser signal is at the detuned frequency.

25. The signal processing method of claim 24, wherein the tunable laser signal is a first tunable laser signal, the detuned frequency is a first detuned frequency, and the control signal is a first control signal;

wherein the laser signals comprise a second tunable laser signal;

wherein the signal processing method comprises transmitting a second control signal to the laser system to alter a frequency of the second tunable laser signal from the on-resonance frequency, where the second tunable laser signal is on-resonance with the optical electronic transition of the vapor, to a second detuned frequency, wherein the second tunable laser signal is detuned relative to the optical electronic transition of the vapor; and wherein the detuned transient response data is generated when the first and second tunable laser signals are at, respectively, the first and second detuned frequencies.

26. The signal processing method of claim 18, wherein the outgoing series of RF pulses share a pulse period in common; and wherein determining the Doppler shift comprises:
 generating a sampled portion of response data by sampling the response data over a sampling period that is based on one or more of the pulse periods,
 comparing the sampled portion of response data to each of a plurality of response templates to determine respective degrees of fit, each response template having template data that represents a known response of the vapor to one or more reference RF pulses, the one or more reference RF pulses different for each response template, selecting one of the response templates based on its degree of fit, and determining the Doppler shift based on the sampled portion of response data and the template data of the selected response template.

27. The signal processing method of claim 18, wherein each of the outgoing series of RF pulses is divided into a sequence of sub-pulses that have respective phases, the respective phases defined by the reference phase modulation according to a pulse compression protocol; and wherein the velocity of the object is determined based on the Doppler shift and respective arrival times of one or more target RF pulses in the incoming series of RF pulses.

28. The signal processing method of claim 27, comprising:

generating, based on the transient response data over time, correlation values for a target RF pulse in the incoming series of RF pulses, wherein:

the target RF pulse is divided into a sequence of target sub-pulses that have respective target phases, the correlation values represent a correlation of the target sub-pulses, in time, with one or more reference sub-pulses of a reference RF pulse, and the one or more reference sub-pulses have respective reference phases that are defined by the reference phase modulation according to the pulse compression protocol; and determining an arrival time of the target RF pulse based on the correlation values.

29. The signal processing method of claim 28, comprising:

assigning, based on the transient response data, respective symbols to the target sub-pulses of the target RF pulse, the respective symbols being part of the pulse compression protocol, the one or more reference sub-pulses associated with respective symbols of the pulse compression protocol.

30. The signal processing method of claim 18, wherein the incoming series of RF signals are received by a receiver system; and wherein the signal processing method comprises determining a distance of the object from the receiver system based on the response data.

* * * * *